United States Patent
Nelson et al.

(10) Patent No.: US 11,533,535 B2
(45) Date of Patent: *Dec. 20, 2022

(54) SIGNATURE RETRIEVAL AND MATCHING FOR MEDIA MONITORING

(71) Applicant: The Nielsen Company (US), LLC, New York, NY (US)

(72) Inventors: Daniel Nelson, Tampa, FL (US); Venugopal Srinivasan, Palm Harbor, FL (US); Arun Ramaswamy, Tampa, FL (US); Raghuram Ranganathan, Tampa, FL (US); Kenneth William McArthur, Dunedin, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,483

(22) Filed: Nov. 16, 2020

(65) Prior Publication Data

US 2021/0144437 A1    May 13, 2021

Related U.S. Application Data

(63) Continuation of application No. 16/188,165, filed on Nov. 12, 2018, now Pat. No. 10,841,650, which is a
(Continued)

(51) Int. Cl.
*H04N 21/40* (2011.01)
*H04N 21/442* (2011.01)
(Continued)

(52) U.S. Cl.
CPC ....... *H04N 21/44213* (2013.01); *G06V 20/46* (2022.01); *H04H 60/31* (2013.01);
(Continued)

(58) Field of Classification Search
None
See application file for complete search history.

(56) References Cited

U.S. PATENT DOCUMENTS

| 5,371,499 A | 12/1994 | Graybill et al. |
| 5,686,902 A | 11/1997 | Reis et al. |

(Continued)

FOREIGN PATENT DOCUMENTS

| CN | 1461565 | 12/2003 |
| CN | 1858799 | 11/2006 |

(Continued)

OTHER PUBLICATIONS

European Patent Office, Communication pursuant to Article 94(3) EPC, mailed in connection with European Patent Application No. 19 195 329.8, dated Sep. 9, 2020, 8 pages.
(Continued)

*Primary Examiner* — Cai Y Chen
(74) *Attorney, Agent, or Firm* — Hanley, Flight & Zimmerman, LLC

(57) ABSTRACT

An example apparatus includes a first query processor to obtain a first hash key, first qualifier data and first value data associated with the first hash key, the first value data including a second hash key and a third hash key; a candidate qualifier to use the first value data to prequalify the first hash key as a candidate for subsequent signature processing associated with a first site signature, the candidate qualifier to: determine prequalification of the first hash key is successful in response to a determination that the second hash key matches a second site signature preceding the first site signature in time and that the third hash key matches a third site signature following the first site signature in time; and determine the prequalification of the first hash key is unsuccessful in response to a determination that at least one of the second hash key fails to match the second
(Continued)

site signature or the third hash key fails to match the third site signature.

18 Claims, 10 Drawing Sheets

Related U.S. Application Data continuation of application No. 15/607,006, filed on May 26, 2017, now Pat. No. 10,129,591, which is a continuation of application No. 14/469,245, filed on Aug. 26, 2014, now Pat. No. 9,668,020.

(60) Provisional application No. 61/976,168, filed on Apr. 7, 2014.

(51) Int. Cl.
| | |
|---|---|
| *H04N 21/44* | (2011.01) |
| *H04N 21/4408* | (2011.01) |
| *H04N 21/258* | (2011.01) |
| *H04N 21/234* | (2011.01) |
| *H04H 60/31* | (2008.01) |
| *H04N 21/8352* | (2011.01) |
| *G06V 20/40* | (2022.01) |
| *H04H 60/40* | (2008.01) |
| *H04H 60/56* | (2008.01) |

(52) U.S. Cl.
CPC . *H04N 21/23418* (2013.01); *H04N 21/25883* (2013.01); *H04N 21/25891* (2013.01); *H04N 21/44008* (2013.01); *H04N 21/4408* (2013.01); *H04N 21/44204* (2013.01); *H04N 21/44222* (2013.01); *H04N 21/8352* (2013.01); *H04H 60/40* (2013.01); *H04H 60/56* (2013.01); *H04H 2201/90* (2013.01)

(56) References Cited

U.S. PATENT DOCUMENTS

| | | | |
|---|---|---|---|
| 6,785,714 | B1 | 8/2004 | Thompson et al. |
| 7,668,851 | B2 | 2/2010 | Triplett |
| 7,793,318 | B2 | 9/2010 | Deng |
| 8,510,608 | B2 | 8/2013 | Futa et al. |
| 9,668,020 | B2 | 5/2017 | Nelson et al. |
| 10,129,591 | B2 | 11/2018 | Nelson et al. |
| 2001/0027479 | A1 | 10/2001 | Delaney et al. |
| 2003/0120647 | A1 | 6/2003 | Aiken et al. |
| 2006/0195861 | A1* | 8/2006 | Lee .............. H04H 60/58 725/19 |
| 2006/0195886 | A1 | 8/2006 | Ashley |
| 2007/0271300 | A1 | 11/2007 | Ramaswamy |
| 2008/0033942 | A1 | 2/2008 | Kao et al. |
| 2009/0049465 | A1 | 2/2009 | Deng |
| 2009/0154916 | A1 | 6/2009 | Huang et al. |
| 2010/0095320 | A1 | 4/2010 | Lee |
| 2010/0293332 | A1 | 11/2010 | Krishnaprasad et al. |
| 2010/0318515 | A1 | 12/2010 | Ramanathan et al. |
| 2011/0173185 | A1 | 7/2011 | Vogel |
| 2012/0291058 | A1 | 11/2012 | Lee et al. |
| 2013/0013324 | A1 | 1/2013 | Topchy et al. |
| 2013/0142331 | A1 | 6/2013 | Schultz |
| 2013/0145099 | A1 | 6/2013 | Liu et al. |
| 2013/0282964 | A1 | 10/2013 | Sengupta et al. |
| 2014/0088742 | A1 | 3/2014 | Srinivasan et al. |
| 2015/0289013 | A1 | 10/2015 | Nelson et al. |
| 2017/0264952 | A1 | 9/2017 | Nelson et al. |

FOREIGN PATENT DOCUMENTS

| | | |
|---|---|---|
| CN | 101164069 | 4/2008 |
| CN | 101477527 | 7/2009 |
| CN | 102497581 | 6/2012 |
| CN | 102567395 | 7/2012 |
| CN | 103312770 | 9/2013 |
| CN | 103460711 | 12/2013 |
| EP | 2626212 | 8/2013 |
| WO | 2007120518 | 10/2007 |
| WO | 2015156843 | 10/2015 |

OTHER PUBLICATIONS

China National Intellectual Property Administration, "First Office Action," issued in connection with Chinese Patent Application No. 201911082452.8, dated Jun. 2, 2021, 22 pages.

European Patent Office, "Intention to Grant," issued in connection with European Patent Application No. 19195329.8, dated Apr. 1, 2021, 5 pages.

Mexican Institute of Intellectual Property, "Notice of Allowance," issued in connection with Mexican Patent Application MX/a/2019/006383, dated May 28, 2021, 6 pages.

China National Intellectual Property Administration, "Notification to Grant the Patent," issued in connection with Chinese Patent Application No. 201911082452.8, dated Nov. 2, 2021, 2 pages.

European Patent Office, "Communication pursuant to Article 94(3) EPC," issued in connection with European Patent Application No. 19195329.8, dated Sep. 9, 2020, 8 pages.

IP Australia, "Notice of Acceptance for Patent Application," issued in connection with Australian Patent Application No. 2014389997, dated Aug. 7, 2017, 3 pages.

International Searching Authority, "Written Opinion," issued in connection with International Patent Application No. PCT/US2014/068173, dated Feb. 26, 2015, 5 pages.

International Bureau, "International Preliminary Report on Patentability," issued in connection with International Patent Application No. PCT/US2014/068173, dated Oct. 12, 2016, 7 pages.

IP Australia, "Examination report No. 1," issued in connection with Australian Patent Application No. 2014389997, dated Mar. 24, 2017, 3 pages.

United States Patent and Trademark Office, "Non-Final Office Action," issued in connection with U.S. Appl. No. 14/469,245, dated Sep. 21, 2015, 9 pages.

United States Patent and Trademark Office, "Final Office Action," issued in connection with U.S. Appl. No. 14/469,245, dated Mar. 16, 2016, 9 pages.

United States Patent and Trademark Office, "Advisory Action," issued in connection with U.S. Appl. No. 14/469,245, dated May 25, 2016, 4 pages.

United States Patent and Trademark Office, "Notice of Panel Decision from Pre-Appeal Brief Review," issued in connection with U.S. Appl. No. 14/469,245, dated Jul. 28, 2016, 2 pages.

Unitd States Patent and Trademark Office, "Notice of Allowance and Fees," issued in connection with U.S. Appl. No. 14/469,245, dated Jan. 20, 2017, 8 pages.

Canadian Intellectual Property Office, "Examination Report," issued in connection Canadian Patent Application No. 2,940,524, dated May 1, 2017, 4 pages.

European Patent Office, "Search Report," issued in connection with European Patent Application No. 14888969.4, dated Jul. 7, 2017, 8 pages.

European Patent Office, "Communication pursuant to Rules 70(2) and 70a(2) EPC," issued in connection with European Patent Application No. 14888969.4, dated Jul. 28, 2017, 1 page.

European Patent Office, "Communication Pursuant to Article 94(3) EPC," issued in connection with European atent Application No. 14888969.4, dated Apr. 13, 2018, 4 pages.

United States Patent and Trademark Office, "Non-Final Office Action," issued in connection with U.S. Appl. No. 15/607,006, dated Jan. 24, 2018, 9 pages.

United States Patent and Trademark Office, "Notice of Allowance," issued in connection with U.S. Appl. No. 15/607,006, dated Jul. 20, 2018, 7 pages.

Canadian Intellectual Property Office, "Notice of Allowance," issued in connection with Canadian Application No. 2,940,524, dated Jun. 6, 2018, 1 page.

(56) References Cited

OTHER PUBLICATIONS

The Mexican Institute of Industrial Property, "Office Action," issued in connection with Mexican Patent Application No. MX/a/2016/010617, dated Sep. 4, 2018, 5 pages.

The Mexican Institute of Industrial Property, "Office Action," issued in connection with Mexican Patent Application No. MX/a/2016/010617, dated May 4, 2018, 5 pages.

China National Intellectual Property Administration, "Notification of the First Office Action," issued in connection with Chinese Patent Application No. 201480077611.4, dated Nov. 28, 2018, 12 pages.

European Patent Office, "Intention to grant" issued in connection with European Patent Application No. 14888969.4, dated Apr. 17, 2019, 59 pages.

European Patent Office, "Search Report," issued in connection with European Patent Application No. 19195,329.8, dated Sep. 24, 2019, 11 pages.

China National Intellectual Property Administration, "Notification to Grant the Patent Right for Invention," issued in connection with Chinese Patent Application No. 201480077611.4, dated Aug. 23, 2019, 2 pages.

Intellectual Property Office of Great Britain, "Examination Report," dated Jan. 31, 2020 in connection with British Patent Application No. GB1617286.8, 4 pages.

United States Patent and Trademark Office, "Non-Final Office," issued in connection with U.S. Appl. No. 16/188,165, dated Sep. 27, 2019, 8 pages.

United States Patent and Trademark Office, "Notice of Allowance," issued in connection with U.S. Appl. No. 16/188,165, dated Jul. 8, 2020, 7 pages.

\* cited by examiner

SIGNATURE RETRIEVAL AND MATCHING FOR MEDIA MONITORING

RELATED APPLICATION(S)

This patent arises from a continuation of U.S. patent application Ser. No. 16/188,165, filed on Nov. 12, 2018, which is a continuation of U.S. patent application Ser. No. 15/607,006, filed on May 26, 2017, which is a continuation of U.S. patent application Ser. No. 14/469,245, filed Aug. 26, 2014, which claims the benefit of and priority from U.S. Provisional Application Ser. No. 61/976,168, filed on Apr. 7, 2014. U.S. patent application Ser. No. 16/188,165, U.S. patent application Ser. No. 15/607,006, U.S. patent application Ser. No. 14/469,245, and U.S. Provisional Application Ser. No. 61/976,168 are hereby incorporated by reference in their entireties. Priority to U.S. Provisional Application Ser. No. 61/976,168, U.S. patent application Ser. No. 14/469,245, U.S. patent application Ser. No. 15/607,006, and U.S. patent application Ser. No. 16/188,165 is hereby claimed.

FIELD OF THE DISCLOSURE

This disclosure relates generally to media monitoring and, more particularly, to signature retrieval and matching for media monitoring.

BACKGROUND

A media monitoring system typically includes one or more device meters to monitor the media presented by one or more media devices located at one or more monitored sites. Such a device meter can use watermarks decoded from the presented media and/or signatures (also referred to as media fingerprints or just fingerprints) generated from the presented media, or both, to monitor (e.g., identify and/or track) the media being presented by a media device. For example, identification codes, such as watermarks, ancillary codes, etc., may be transmitted within media signals. Identification codes are data that are transmitted with media (e.g., inserted into the audio, video, or metadata stream of media) to uniquely identify broadcasters and/or the media (e.g., content or advertisements), and/or are associated with the media for another purpose, such as tuning (e.g., packet identifier headers ("PIDs") used for digital broadcasting). Codes are typically extracted using a decoding operation.

In contrast, signatures are a representation of some characteristic of the media signal (e.g., a characteristic of the frequency spectrum of the signal). Signatures can be thought of as fingerprints. They are typically not dependent upon insertion of identification codes in the media but, instead, preferably reflect an inherent characteristic of the media and/or the signal transporting the media. Systems to utilize codes and/or signatures for audience measurement are long known. See, for example, Thomas, U.S. Pat. No. 5,481,294, which is hereby incorporated by reference in its entirety.

When signatures are used for media monitoring, signatures of the monitored media (referred to herein as site signatures) are generated by the device meter and compared to reference signatures representative of reference media known to the media monitoring system. When a match is found, the media corresponding to the site signature being processed can be identified as corresponding to the reference media represented by the matching reference signature(s). In many media monitoring systems, the device meters provide their generated site signatures to a data processing facility or other centralized processing site for comparison with the reference signatures that are representative of the reference media available for presentation at the respective monitored sites. Such comparison may involve comparing large numbers of site signatures with large numbers of reference signatures, especially when the number of monitored sites is large and/or the amount of possible reference media available for consumption is large.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
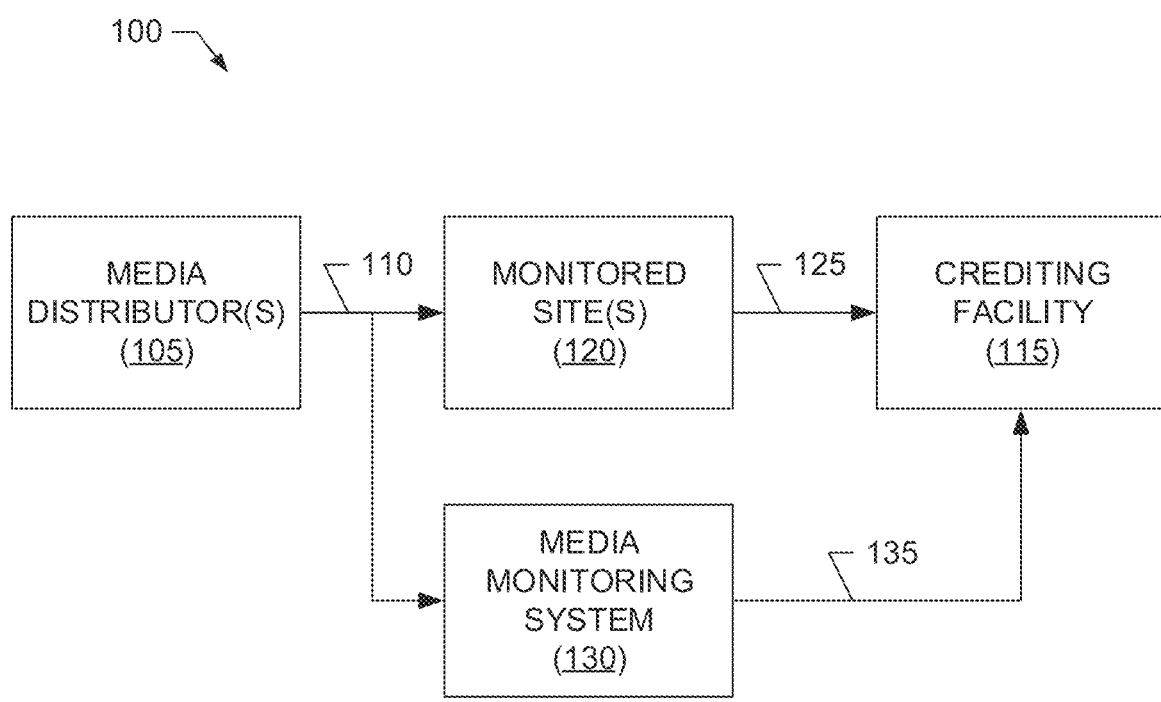
FIG. 1 is block diagram of an example system capable of performing signature retrieval and matching for media monitoring as disclosed herein.

Methods, apparatus, systems and articles of manufacture (e.g., physical storage media, structures, etc.) to perform signature retrieval and matching for media monitoring are disclosed herein. Some example signature retrieval and matching methods disclosed herein include querying a first table using a first site signature obtained from a monitored site. For example, the first table can include hash keys corresponding to respective reference signatures, and can further include respective qualifier data descriptive of respective ones of the reference signatures (and/or descriptive of reference media represented by the respective ones of the reference signatures). Such example methods can also include querying a second table using first qualifier data obtained from querying the first table using the first site signature. For example, the first qualifier data can be descriptive of a first reference signature (and/or first reference media represented by the first reference signature) corresponding to a first hash key determined to match the first site signature. Such example methods can further include comparing a first block of site signatures with a portion of a plurality of blocks of reference signatures obtained from querying the second table using the first qualifier data.

In some such examples, the first qualifier data includes a first timestamp associated with a first block of reference signatures including the first reference signature. In some such examples, the first qualifier data also includes first media identification data identifying first reference media represented by the first reference signature.

In some such examples, the plurality of blocks of reference signatures obtained from querying the second table using the first qualifier data include: (1) the first block of reference signatures representative of the first reference media and associated with the first timestamp, (2) a second block of reference signatures representative of the first reference media and associated with a second timestamp preceding the first timestamp, and (3) a third block of reference signatures representative of the first reference media and associated with a third timestamp following the first timestamp. In some such examples, the first qualifier data further includes a first offset specifying a position of the first reference signature in the first block of reference signatures, and the first block of site signatures includes neighboring site signatures of the first site signature. Some such example methods further include aligning the first block of site signatures with a portion of the first, second and third blocks of reference signatures based on the offset. Such example methods can also include comparing the first block of site signatures with the portion of the first, second and third blocks of reference signatures.

Additionally or alternatively, in some such examples, the first reference signature is representative of first reference media, and the plurality of blocks of reference signatures is a first plurality of blocks of reference signatures representative of the first reference media. Some such example methods further include querying the second table using second qualifier data obtained from querying the first table using the first site signature. For example, the second qualifier data can be descriptive of a second reference signature corresponding to a second hash key determined to match the first site signature, and the second reference signature can be representative of second reference media. Such example methods can also include comparing the first block of site signatures with a portion of a second plurality of blocks of reference signatures obtained from querying the second table using the second qualifier data. For example, the second plurality of blocks of reference signatures can be representative of the second reference media.

Additionally or alternatively, some such example methods can also include obtaining the first hash key, the first qualifier data and first value data associated with the first hash key in response to querying the first table using a first site signature. Some such example methods can also include using the first value data to prequalify the first hash key as a candidate for subsequent signature processing associated with the first site signature. For example, some such example methods can further include obtaining a second hash key, second qualifier data and second value data associated with the second hash key in response to querying the first table using a first site signature. In such examples, the second hash key can have been determined to match the first site signature, and the second qualifier data can be descriptive of a second reference signature corresponding to the second hash key. Such example methods can also include querying the second table using the second qualifier data in response to a successful prequalification of the second hash key based on the second value data, but not querying the second table using the second qualifier data in response to an unsuccessful prequalification of the second hash key based on the second value data.

Furthermore, in some such examples, the first reference signature is representative of first reference media, the first value data includes a second hash key and a third hash key both representative of the first reference media, and the second hash key precedes the first hash key in time, whereas the third hash key follows the first hash key in time. In some such examples, using the first value data to prequalify the first hash key includes determining prequalification of the first hash key is successful in response to determining that the second hash key matches a second site signature preceding the first site signature in time and that the third hash key matches a third site signature following the first site signature in time. In some such examples, using the first value data to prequalify the first hash key also includes determining prequalification of the first hash key is unsuccessful in response to determining that at least one of the second hash key fails to match the second site signature or the third hash key fails to match the third site signature.

These and other example methods, apparatus, systems and articles of manufacture (e.g., physical storage media, structures, etc.) to perform signature retrieval and matching for media monitoring are disclosed in greater detail below.

As mentioned above, in media monitoring systems employing media signatures, the device meters monitoring media presented by media devices at monitored sites typically provide their generated site signatures to a data processing facility or other centralized processing site for comparison with the reference signatures that are representative of the possible reference media available for presentation at the respective monitored sites. In prior media monitoring systems, the central data processing facility may store the reference signatures in random access memory (RAM) for comparison with the site signatures obtained from the monitored sites. However, as the amount of possible reference media available for presentation increases, the number of possible reference signatures to be compared also increases. In prior media monitoring systems, the increasing number of references signatures requires more and more RAM to store the reference signatures for comparison, to the point at which the amount of RAM may become cost prohibitive and/or unwieldy to manage.

In contrast, media monitoring systems employing signature retrieval and matching as disclosed herein can perform signature matching more efficiently than prior systems. Some example media monitoring systems employing signature retrieval and matching as disclosed herein utilize a database employing a double index hashing strategy in which a first table—a hash table—is stored in RAM and queried using site signatures obtained from monitored sites to retrieve candidate reference signatures for further examination. The first hash table can be relatively lightweight and have a smaller RAM footprint than that of prior media monitoring systems. The double index hashing strategy of such examples also utilizes a second table—a block table—storing blocks of reference signatures that can be retrieved for matching using the candidate reference signatures retrieved from the hash table. The block table need not be stored in RAM (although it could be), and may or may not be stored remotely from the hash table. The (relatively few) blocks of signatures retrieved from the block table can be temporarily stored in RAM for signature matching. In some examples, signature matching processing is offloaded to servers or other computing devices implementing the block table, thereby supporting parallel and/or distributed data processing.

Turning to the figures, a block diagram of an example system 100 capable of performing signature retrieval and matching for media monitoring as disclosed herein is illustrated in FIG. 1. The example system 100 of FIG. 1 includes one or more example media distributor(s) 105 to distribute media for presentation by media devices. A media distributor 105 can correspond to any type of media distributor, such as a television station, a cable network, a satellite network (e.g., television or radio), a radio station, a streaming media service (e.g., such as Hulu™, Netflix®, etc.), etc. As such, the media distributed by the media distributor(s) 105 can correspond to any type of media, such as television programming, radio programming, multimedia (e.g., audio and/or visual) data, etc. In the illustrated example, the media distributor(s) 105 can distribute a particular piece of media (e.g., such as a particular television program, a particular radio program, a particular movie, etc.) to recipients (e.g., television viewers, radio listeners, computer users, electronic device users, etc.) via one or more example distribution media 110 (e.g., such a one or more radio frequency, cable and/or satellite television and/or radio channels, one or more networks carrying one or more digital transport channels, etc.).

Figure 2:
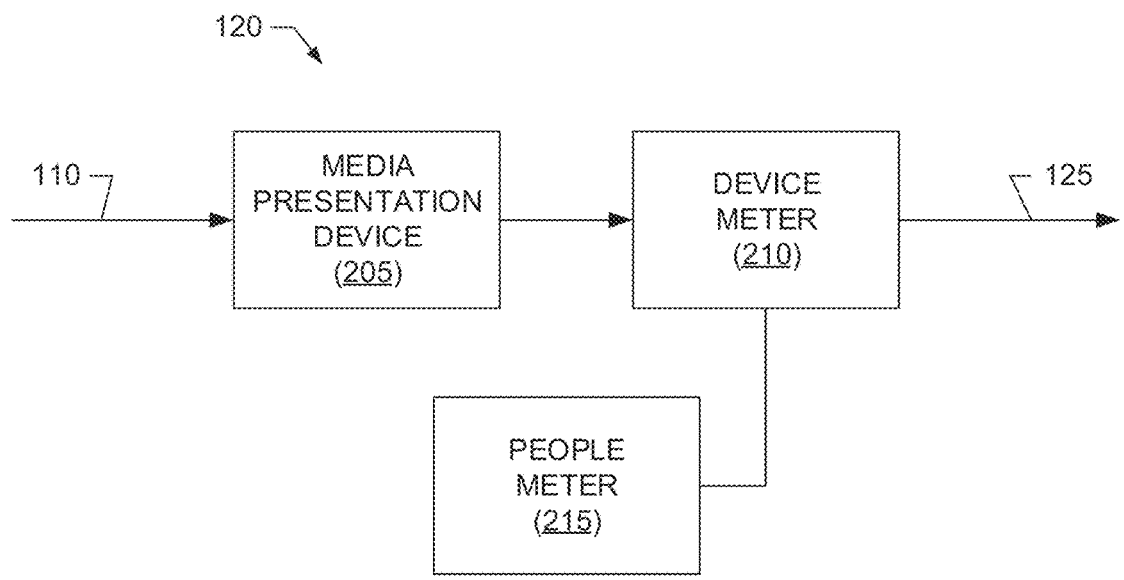
FIG. 2 is a block diagram of an example monitored site that may be included in the example system of FIG. 1.

In the example system 100 of FIG. 1, the media distributor(s) 105 distribute media via the distribution media 110 to one or more example monitored sites 120 that, for example, correspond to one or more panelists selected (e.g., statistically) for inclusion in an audience measurement panel, media monitoring survey, etc. Each monitored site 120 includes one or more media devices to present the media received at the monitored site. Each monitored site 120 also includes one or more device meters to monitor the media presented by these media device(s). For example, a device meter at a particular monitored site 120 can determine metering data that may identify and/or be used to identify media presented by a media device (and, thus, infer media exposure) at the monitored site 120. In some examples, the monitored site 120 also includes a people meter to determine audience identification data (also referred to as demographic data, people meter data, etc.) identifying the audience members (e.g., panelists) being exposed to the monitored media, and/or in the vicinity of the monitored media device, etc. In such examples, the device meter combines the metering data with the audience identification data to determine audience measurement data characterizing media exposure at the monitored site 120. The device meter can then store and report the metering data (or audience measurement data) to an example crediting facility 115 via an example reporting medium 125. In the illustrated example, the reporting medium 125 can be any type of data transmission medium, such as one or more data networks (e.g., such as the Internet), one or more mobile telephone (e.g., cellular) networks, a dial-up connection, etc. An example implementation of a monitored site 120 is illustrated in FIG. 2, which is described in greater detail below.

In the system 100 of the illustrated example, the crediting facility 115 performs signature retrieval and matching for media monitoring as disclosed herein. Unlike media monitoring techniques based on codes and/or watermarks included with and/or embedded in the monitored media, signature-based media monitoring techniques generally use one or more inherent characteristics of the monitored media during a signature sampling interval to generate a substantially unique proxy for the media. Such a proxy is referred to as a signature or media fingerprint, and can take the form of a series of bits, data values, a waveform, etc., representative of the media signal(s) (e.g., an audio signal and/or a video signal) forming the media presentation being monitored. A good signature is usually one that is repeatable when processing the same media presentation, but that is unique relative to other (different) presentations of other (different) media. Thus, as used herein, a signature is a representation of some characteristic of the media signal (e.g., a characteristic of the frequency spectrum of the signal) which can be used to identify the signal, and can be thought of as a fingerprint. Signatures are typically not dependent upon insertion of identification codes in the media, but instead preferably reflect an inherent characteristic of the media and/or the signal transporting the media. Systems to utilize codes and/or signatures for audience measurement are long known. See, for example, Thomas, U.S. Pat. No. 5,481,294, which is hereby incorporated by reference in its entirety.

In the example system 100 of FIG. 1, signature-based media monitoring generally involves a device meter determining (e.g., generating) site signature(s) (also referred to as collected signature(s) or metered signature(s)) representative of a media signal (e.g., an audio signal and/or a video signal) output by a monitored media device at a monitored site 120. The device meter at the monitoring site 120 includes the site signature(s) in the metering data reported to the example crediting facility 115. The crediting facility 115 then compares the site signature(s) to one or more references signatures corresponding to known (e.g., reference) media. Various comparison criteria, such as a cross-correlation value, a Hamming distance, population (POP) count, etc., can be evaluated to determine whether a site signature (or block of site signatures) matches a particular reference signature (or block of reference signatures). When a match between the site signature(s) and one of (or a block of) the reference signatures is found, the monitored media represented by the site signature(s) can be identified as corresponding to the particular reference media represented by the reference signature(s) that matched the site signature(s). Because attributes, such as an identifier of the media, a presentation time, a broadcast channel, etc., are collected and, thus, known for the reference media represented by the matching reference signature(s), the crediting facility 115 may associate the monitored media with these same attributes of the matching reference media. The crediting facility 115 can then use the identified attributes of the monitored media to perform any appropriate post-processing to, for example, determine audience ratings information, identify targeted advertising to be provided to the monitored site 120, etc.

The crediting facility 115 of the illustrated example employs signature retrieval and matching as disclosed herein to facilitate efficient retrieval of reference signatures for comparison with the site signatures obtained from the monitored sites 120. As disclosed in further detail below, the example crediting facility 115 utilizes a database employing a double index hashing strategy involving a first table, referred to herein as a hash table, and a second table, referred to herein as a block table. The hash table is arranged such that each entry corresponds to a reference signature and is indexed using a hash key, which may correspond to a hash of the reference signature or the data value of the reference signature itself. The hash table entry for a particular reference signature also includes qualifier data descriptive of the reference signature and, in at least some examples, value data that may be used to prequalify the reference signature as a good candidate for further signature matching processing, as described in further detail below. The block table is arranged such that each entry corresponds to a particular value, or combination of values, of the qualifier data and, thus, is indexed using qualifier data retrieved in response to querying the hash table. The block table entry for a particular value, or combination of values, of the qualifier data also includes blocks of reference signatures corresponding to that qualifier data, which can be retrieved for comparison with a block of site signature(s) reported by the device meter at a monitored site 120. Operation of the crediting facility 115 to use the hash table and block table for signature retrieval and matching is described in further detail below in connection with the example implementation of the crediting facility 115 illustrated in FIG. 6.

Figure 3:
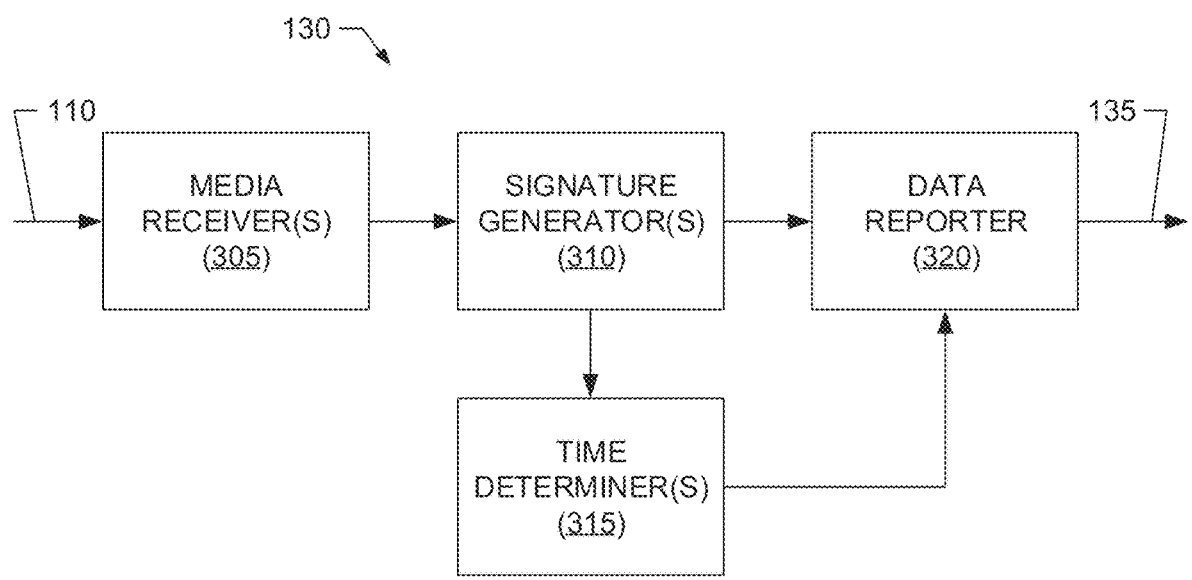
FIG. 3 is a block diagram of an example media monitoring system that may be included in the example system of FIG. 1.

The example system 100 of FIG. 1 also includes an example media monitoring system (MMS) 130 to generate some or all of the reference signatures used by the crediting facility 115. As described in further detail below, in some examples, the MMS 130 is located separately from the monitored site(s) 120 and monitors media distributions by some or all of the media distributor(s) 105. The MMS 130 determines reference signatures from the media distributions, which correspond to the possible media that could be received by the monitored site(s) 120. For example, for each media distribution monitored by the MMS 130, the MMS 130 generates respective reference signatures (e.g., blocks of reference signatures associated with a signature monitoring interval), timestamps the reference signatures with time information (e.g., such as day and/or time-of-day information) corresponding to when the monitored media was received at the MMS 130, and associates media identification information with the reference signatures. The MMS 130 then stores and reports the timestamped reference signatures and media identification information to the crediting facility 115 via an example reporting medium 135. In the illustrated example, the reporting medium 135 can be any type of data transmission medium, such as one or more data networks (e.g., such as the Internet), one or more mobile telephone (e.g., cellular) networks, a dial-up connection, etc. An example implementation of the MMS 130 is illustrated in FIG. 3, which is described in greater detail below.

A block diagram of an example implementation of one of the monitored sites 120 of FIG. 1 is illustrated in FIG. 2. The example monitored site 120 of FIG. 2 includes an example media presentation device 205 (also referred to herein as a media device 205) to present media received via the distribution medium 110. The media presentation device 205 can correspond to any type of media device, such as a set-top box, a television, a radio, a multimedia computer system, tablet computer, a portable digital assistant, a cellular/mobile smartphone, etc.

The example monitored site 120 of FIG. 2 also includes an example device meter 210, also referred to as a meter 210, a site meter 210, a site unit 210, a home unit 210, a media meter 210, etc., to monitor media presented by the media device 205. In the illustrated example, the media monitored by the device meter 210 can correspond to any type of media presentable by the media device 205. For example, monitored media can be media content, such as television programs, radio programs, movies, etc., and/or commercials, advertisements, etc. In the illustrated example, the device meter 210 determines metering data that may identify and/or be used to identify media exposure (and, thus, infer media consumption) at the monitored site 120. The metering data determined by the example device meter 210 includes site signatures representative of the media presented by the media device 205.

For example, in the example monitored site 120 of FIG. 2, the device meter 210 may utilize invasive monitoring involving one or more physical connections to the media device 205, and/or non-invasive monitoring not involving any physical connection to the media device 205, to obtain access to one or more media signals corresponding to the media being presented by the media device 205. In some examples, the device meter 210 may process audio signals obtained from the media device 205 via a microphone and/or other audio sensor(s), and/or via a direct cable connection, to generate audio site signatures representative of the media being presented by the media device 205. Additionally or alternatively, the device meter 210 may process video signals obtained from the media device 205 via a camera and/or other video sensor(s), and/or a direct cable connection, to generate video site signatures (e.g., image signatures) representative of the media being presented by the media device 205. The site signatures generated by the device meter 210 at respective generation intervals can then be compared (e.g., at the crediting facility 115) with known reference signatures to identify/monitor the media being presented by the media device 205.

In some examples, the monitored site 120 also includes an example people meter 215 to capture audience identification information describing an audience being exposed to the media presented by the media device 205. In some examples, the people meter 215 can prompt audience member(s) in the vicinity of the media device 205 to identify which one or more of a possible group of audience members are present in the audience. Additionally or alternatively, in some examples, the people meter 215 can automatically identify one or more individual included in an audience in the vicinity of the media device 205. In such examples, the device meter 210 may combine the metering data identifying (e.g., directly or indirectly) the media being presented by the media device 205 with the audience identification data determined by the people meter 215 to form audience measurement data characterizing media exposure (e.g., with demographic information) at the monitored site 120.

The device meter 210 of the illustrated example stores the metering data (or audience measurement data), including the generated site signatures, for reporting to the crediting facility 115 via the reporting medium 125. The generated site signatures in the metering data are also timestamped to allow the site signatures to be associated with the particular time when the site signatures were generated. The timestamps also indicate the time at which the monitored media represented by the site signatures was presented at the monitored site 120. The device meter 210 can report the metering data/audience measurement data (including the site signatures and timestamps) as it is collected (e.g., streamed), at specified/predetermined time intervals, when a certain amount of data has been collected, when an available memory space is filled or reaches a threshold capacity (e.g., 90% or some other percentage being full), and/or via any other periodic, aperiodic and/or event-driven schedule.

Figure 4:
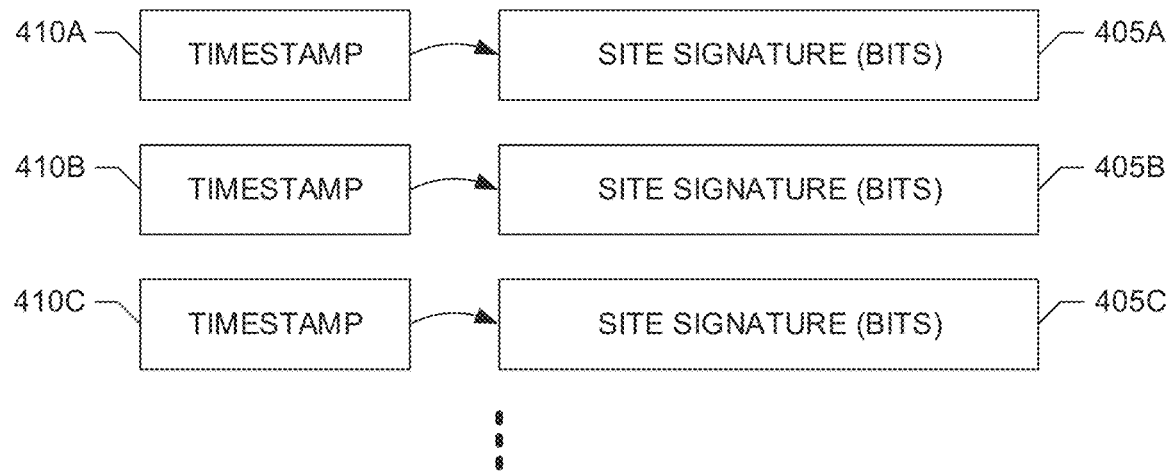
FIG. 4 illustrates example site signatures that may be obtained from the example monitored site of FIG. 2.

Example site signatures that can be generated and reported by the example device meter 210 of FIG. 2 are illustrated in FIG. 4. In the illustrated example of FIG. 4, the device meter 210 generates example site signatures 405A-C at successive signature generation intervals. The example site signatures 405A-C, collectively referred to as the site signatures 405, are digital values represented by some number of bits. For example, each site signature 405A-C may be a digital value represented by 3 bytes, which corresponds to 24 bits. Of course, the site signatures 405A-C may be digital values represented by a different number of bits. As described above, the digital values making up the site signatures 405A-C may correspond to, for example, spectral-domain values, time-domain values and/or values of other characteristics of the media signal(s) presented by the media device 205 monitored by the device meter 210.

In the illustrated example of FIG. 4, the device meter 210 associates the site signatures 405A-C with respective example timestamps 410A-C, collectively referred to as the timestamps 410, as well as other metering metadata, such as a meter identifier, one or more panelist identifiers, etc. The example timestamp 410A can be a day/time value indicating the time at which the respective site signature 405A was generated. For example, the device meter 210 may be configured to generate site signatures at a particular signature generation interval (e.g., approximately a 15 millisecond (ms) interval, corresponding to generating 64 signatures per second, or at some other interval). In such examples, the timestamps 410A-C can have sufficient resolution to identify the particular signature generation interval at which a particular one of the site signatures 405A-C was generated. Although each site signature 405A-C is associated with a respective timestamp 410A-C in the example of FIG. 4, in other examples, multiple site signatures (e.g., a block of site signatures) may be associated with a single timestamp (e.g., which identifies the starting time at which the block of site signatures was generated).

A block diagram of an example implementation of the MMS 130 of FIG. 1 is illustrated in FIG. 3. As discussed above, the MMS 130 may be located separately from the monitored site(s) 120 and monitors one, some or all of the different media being distributed by the media distributor(s) 105 via the distribution media 110. In the illustrated example of FIG. 3, the MMS 130 includes one or more media receivers 305 to receive media being distributed by the media distributor(s) 105 via the distribution media 110. For example, the media receiver(s) 305 can include multiple receivers assigned to respective media distributors 105, such as particular television channels/networks, particular radio channels/networks, particular streaming services, etc. Additionally or alternatively, one or more of the media receiver(s) 305 can be shared (e.g., time-multiplexed) among multiple media distributors 105.

The example MMS 130 of FIG. 3 also includes one or more signature generators 310 to generate reference signatures representative of the media received by the media receiver(s) 305. For example, the signature generator(s) 310 can include audio signature generator(s) to generate audio signatures representative of the audio signal(s) corresponding to audio portion(s) of the media received by the media receiver(s) 305. Additionally or alternatively, the signature generator(s) 310 can include video signature generator(s) to generate video (e.g., image) signatures representative of the video signal(s) corresponding to video portion(s) of the media received by the media receiver(s) 305. As such, in some examples, the signature generator(s) 310 may implement signature generation technique(s) similar to those implemented by the device meter(s) 210 at the monitored sites(s) 120.

The signatures generated by the signature generator(s) 310 are reference signatures that can be used (e.g., by the crediting facility 115) to identify corresponding media being distributed by the media distributor(s) 105. For example, for each media distribution received and processed by the MMS 130, the reference signatures output from the signature generator(s) are associated with media identification data (e.g., such as a source identifier, a stream identifier, etc., as described in further detail) identifying the particular media represented by the reference signatures. Such media identification data can be known to the MMS 130 based on, for example, the known association of the media receiver(s) 305 to the respective media distributor(s) 105.

The example MMS 130 of FIG. 3 further includes one or more time determiner(s) 315 to determine time information for association with the reference signatures determined by the signature generator(s) 310. For example, a signature generator 310 can trigger a time determiner 315 to determine time information (e.g., timestamps) indicating when reference signatures for a particular piece of media were generated and, thus, when the corresponding reference media was received by the respective media receiver 305. The time information can include, for example, the particular day and/or time-of-day at which a particular block of reference signatures was generated, which corresponds to the particular day and/or time-of-day at which the media represented by this block of reference signatures was received by the MMS 130. In some examples, each signature generator 310 is associated with a respective time determiner 315. In some examples, groups of signature generators 310 are associated with a respective time determiner 315. The time determiner(s) 315 can include any timing source, such as a clock, timer, etc., capable of providing time information having an acceptable accuracy.

Figure 5:
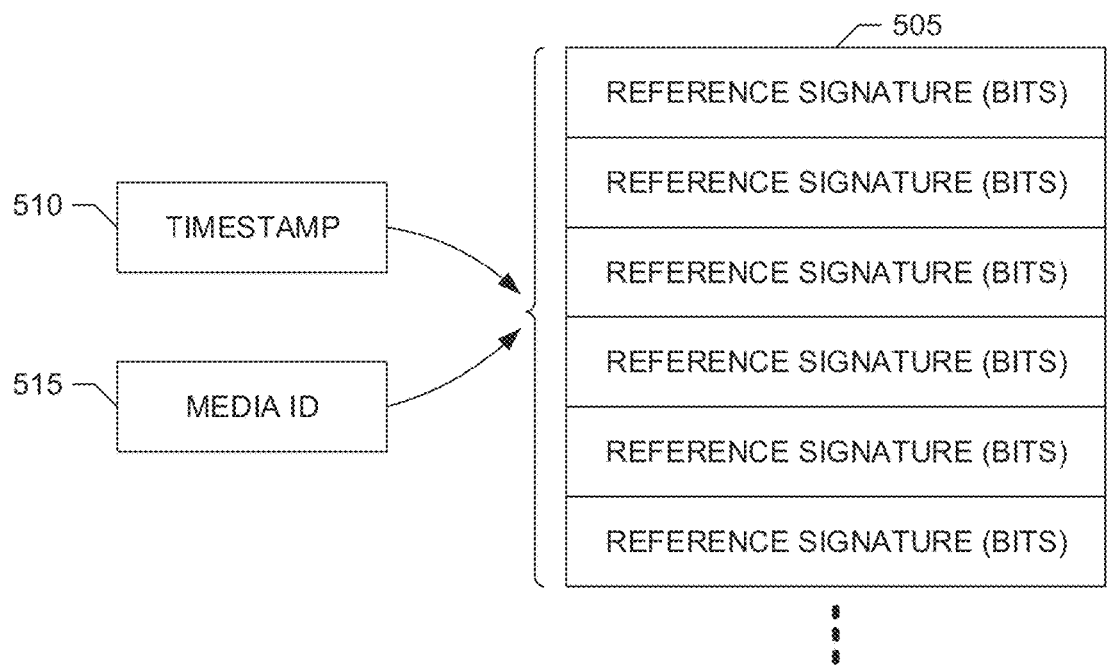
FIG. 5 illustrates example reference signatures that may be obtained from the example media monitoring system of FIG. 3.

Example reference signatures that can be generated and reported by the example MMS 130 of FIG. 3 are illustrated in FIG. 5. In the illustrated example of FIG. 5, the MMS 130 generates example reference signature blocks 505, which contain one or more example reference signatures, at successive signature generation intervals. Each of the reference signatures included in an example reference signature block 505 is a digital value represented by some number of bits. For example, each reference signature in the reference signature block 505 may be a digital value represented by 3 bytes, which corresponds to 24 bits. Of course, the reference signatures in the reference signature block 505 may be digital values represented by a different number of bits. As described above, the digital values making up the reference signatures in the reference signature block 505 may correspond to, for example, spectral-domain values, time-domain values and/or one or more values of one or more other characteristics of the media signal(s) received by the media receiver(s) 305 at the MMS 130.

In the illustrated example of FIG. 5, the MMS 130 associates the reference signature block 505 with other reference metadata, such as a respective example timestamp 510 and a respective example media identifier 515. The example timestamp 510 can be a day/time value indicating the start time at which the reference signature block 505 was generated. For example, a signature generator 310 at the MMS 130 may be configured to generate reference signatures at a particular signature generation interval (e.g., approximately a 15 ms interval, corresponding to generating 64 signatures per second, or some other interval). In such examples, the timestamp 510 can have sufficient resolution to identify the start time at which the reference signatures included in the reference signature block 505 were generated. For example, in the case of the signature generator 310 being configured to generate 64 reference signatures per second (e.g., corresponding to a signature generation interval of approximately 15 ms), then the timestamp 510 may have a resolution of 1 second (sec.) if the reference signature block 505 contains 64 reference signatures, 2 sec. if the reference signature block 505 contains 128 reference signatures, etc. In the illustrated example of FIG. 5, the media identifier 515 may include a source identifier, a stream identifier, etc., identifying the particular reference media represented by the reference signatures in the reference signature block 505.

Returning to FIG. 3, the illustrated example MMS 130 also includes an example data reporter 320 to report reference data to the crediting facility 115 via the example reporting medium 135. For example, the reference data reported by the example data reporter 320 can include reference signature blocks 505 and associated timestamps 510 and media identifiers 515 generated by the signature generator(s) 310 and the time determiner(s) 315. The data reporter 320 can report the reference data (including the reference signature blocks 505, the associated timestamps 510 and the media identifiers 515) as it is collected (e.g., streamed), at specified/predetermined time intervals, when a certain amount of data has been collected, when an available memory space is filled or reaches a threshold capacity (e.g., 90% or some other percentage being full), etc.

Figure 6:
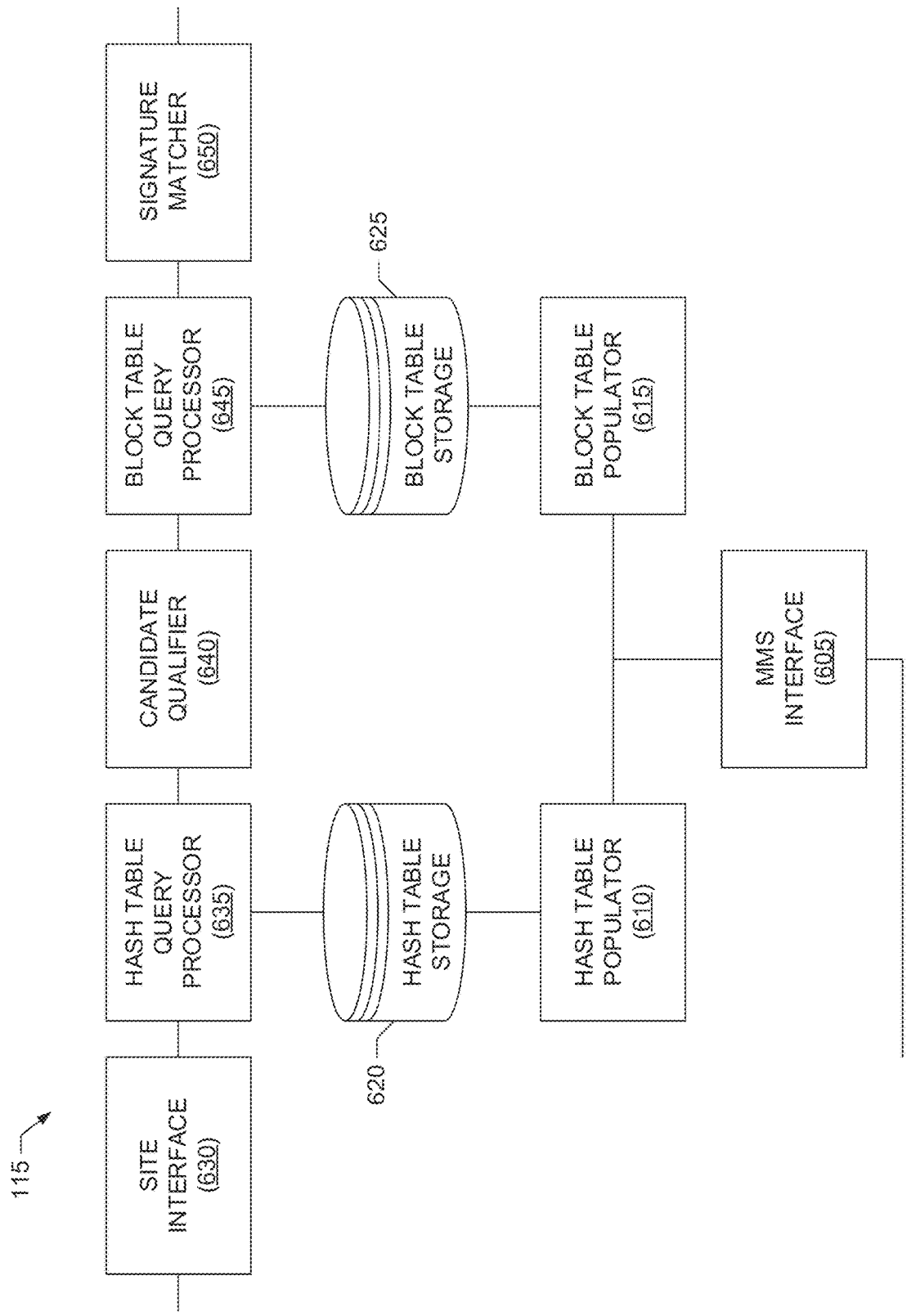
FIG. 6 is a block diagram of an example crediting facility that may be included in the example system of FIG. 1.

A block diagram of an example implementation of the crediting facility 115 of FIG. 1 is illustrated in FIG. 6. The block diagram of FIG. 6 illustrates structures associated with implementing signature retrieval and matching at the crediting facility 115. Other structures implemented by the crediting facility 115 have been omitted for clarity.

Turning to FIG. 6, the illustrated example crediting facility 115 includes an example MMS interface 605 to interface with an MMS, such as the example MMS 130 of FIGS. 1 and/or 3. As such, the MMS interface 605 can be implemented using any interface technology, communication device(s), etc., capable of interfacing with and receiving data via the example reporting medium 135. The example MMS interface 605 receives reference data from the MMS 130 including, for example, the reference signature blocks 505, the associated timestamps 510 and the media identifiers 515.

As mentioned above, the crediting facility 115 of the illustrated example employs a double index hashing strategy for signature retrieval and matching, which involves a first table, referred to herein as a hash table, and a second table, referred to herein as a block table. Accordingly, the example crediting facility 115 of FIG. 6 includes an example hash table populator 610 to populate a hash table to be used by the crediting facility 115. The example crediting facility 115 of FIG. 6 also includes an example block table populator 615 to populate a block table to be used by the crediting facility 115. An example hash table 710 and an example block table 715 that can be used by the crediting facility 115 for signature retrieval and matching are illustrated in FIG. 7.

Figure 7:
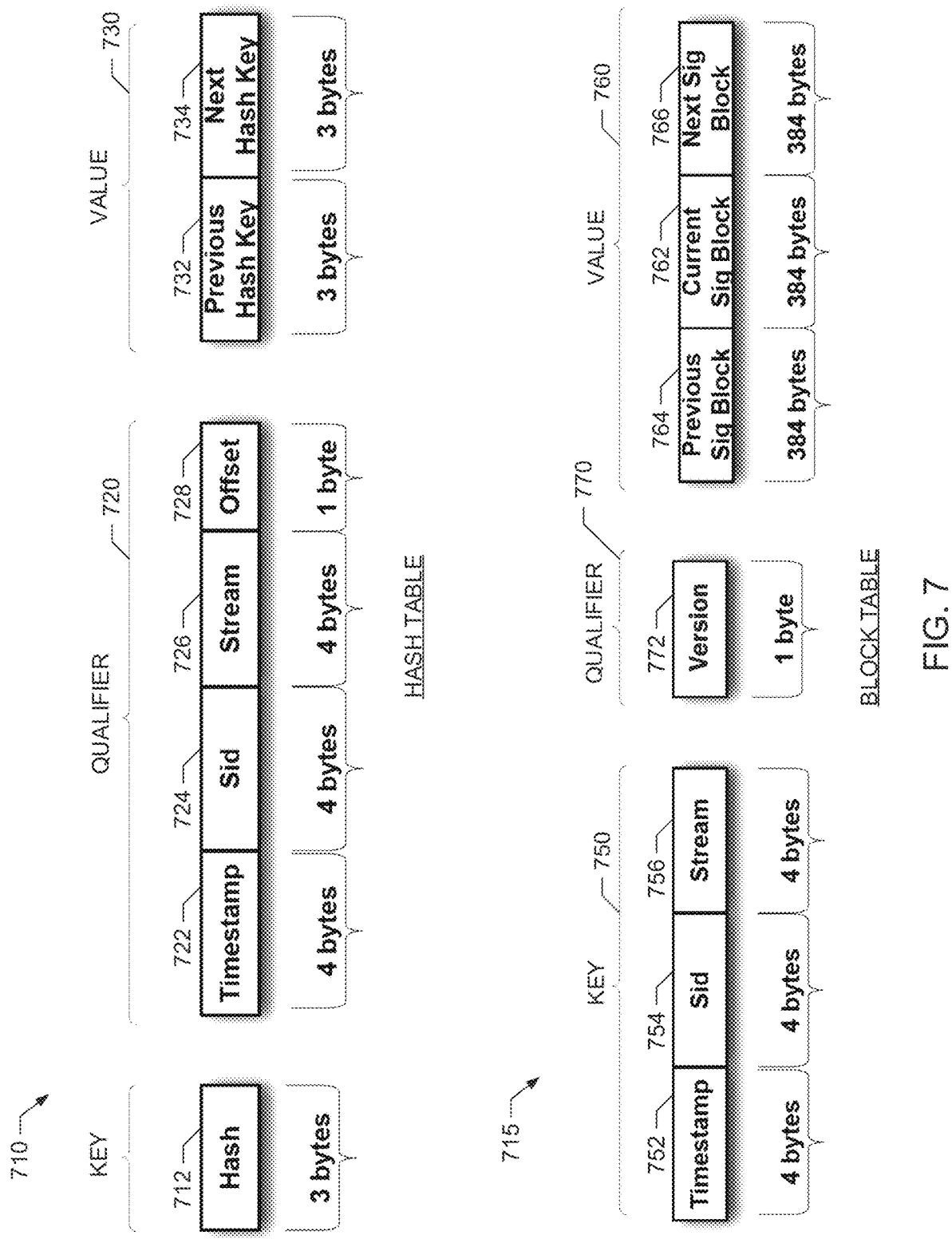
FIG. 7 illustrates an example hash table and an example block table that may be used by the example crediting facility of FIG. 6 to perform signature retrieval and matching for media monitoring as disclosed herein.

Turning to FIG. 7, the example hash table 710 illustrated therein includes entries (e.g., rows) corresponding to the respective reference signatures received from the MMS 130 via the interface 605. For example, each entry of the hash table 710 corresponds to a respective reference signature and is indexed using an example hash key 712. The hash key 712 may correspond to a value of the particular reference signature corresponding to the hash table entry, or may correspond to a hash of the reference signature value (e.g., to reduce data space). For convenience, in the following description, the hash key 712 is assumed to correspond to the value of the particular reference signature corresponding to the hash table entry.

In the illustrated example, the entry of the hash table 710 corresponding to a particular reference signature represented by the hash key 712 also includes example qualifier data 720 descriptive of the reference signature. For example, the qualifier data 720 can include metadata, such as an example timestamp 722, an example source identifier 724, an example stream identifier 726 and an example offset 728. In the illustrated example of FIG. 7, the timestamp 722 included in the qualifier data 720 corresponds to the timestamp 510 of the particular reference signature block 505 reported by the MMS 130 and containing the particular reference signature corresponding to the hash table entry. In the illustrated example of FIG. 7, the source identifier 724 and the stream identifier 726 are obtained from the media identifier 515 reported by the MMS 130 for the particular reference signature block 505 containing the particular reference signature corresponding to the hash table entry. In the illustrated example of FIG. 7, the offset 728 identifies the position of the particular reference signature, which corresponds to the hash table entry, in its respective reference signature block 505 reported by the MMS 130. As such, in the illustrated example of FIG. 7, the timestamp 722, source identifier 724, and stream identifier 726 will be the same for the hash table entries corresponding to reference signatures included in the same reference signature block 505. However, the offset 728 will be different for each of these hash table entries and will provide the particular position of each reference signature in the reference signature block 505.

In some examples, the entry of the hash table 710 corresponding to a particular reference signature represented by the hash key 712 further includes example value data 730 that may be used to prequalify the reference signature corresponding to the hash table entry as a good candidate for further signature matching processing. In the illustrated example of FIG. 7, the value data 730 includes an example previous hash key 732 and an example next hash key 734. The previous hash key 732 corresponds to a reference signature preceding the particular reference signature corresponding to the hash key 712 and having the same source identifier 724 and stream identifier 726. Referring to the particular reference signature corresponding to the hash key 712 as the current reference signature, then the previous hash key 732 may correspond to a reference signature preceding the current signature in the same reference signature block 505, or in the preceding reference signature block 505 for the same source identifier 724 and stream identifier 726. In some examples, the previous hash key 732 corresponds to the reference signature immediately preceding the current reference signature, whereas in other examples, there may be one or more intervening reference signatures between the current reference signature and the preceding reference signature corresponding to the previous hash key 732. The next hash key 734 corresponds to a reference signature following the particular reference signature corresponding to the hash key 712 and having the same source identifier 724 and stream identifier 726. Again referring to the particular reference signature corresponding to the hash key 712 as the current reference signature, then the next hash key may correspond to a reference signature following the current signature in the same reference signature block 505, or in the following reference signature block 505 for the same source identifier 724 and stream identifier 726. In some examples, the next hash key 734 corresponds to the reference signature immediately following the current reference signature, whereas in other examples, there may be one or more intervening reference signatures between the current reference signature and the subsequent reference signature corresponding to the previous hash key 732. Similar to the hash key 712, the previous hash key 732 and next hash key 734 may be equal to the values of their respective reference signatures, or may correspond to a hash of the respective reference signature values (e.g., to reduce data space). For convenience, in the following description, the previous hash key 732 and next hash key 734 are assumed to correspond to the values of the respective previous and next reference signatures. Use of the previous hash key 732 and next hash key 734 to prequalify the reference signature corresponding to the current hash key 712 is described in further detail below.

The example block table 715 illustrated in FIG. 7 includes entries corresponding to each reference signature block 505 reported by the MMS 130. In the example of FIG. 5, each reference block 505 is identifiable using its respective timestamp 510 and media identifier 515. Accordingly, each entry of the block table 715 is indexed using an example key 750 including metadata, such as an example timestamp 752, an example source identifier 754 and an example stream identifier 756. In the illustrated example of FIG. 7, the timestamp 752, the source identifier 754 and the stream identifier 756 correspond respectively to the timestamp 722, the source identifier 724 and the stream identifier 726 included in the example qualifier data 720 of the example hash table 710. As such, the qualifier data 720 returned in response to querying the hash table 710 can be used to index into the example block table 715. In the illustrated example of FIG. 7, the timestamp 752 included in the key 750 corresponds to the timestamp 510 of the particular reference signature block 505 corresponding to the block table entry. In the illustrated example of FIG. 7, the source identifier 754 and the stream identifier 756 of the key 750 are obtained from the media identifier 515 reported by the MMS 130 for the particular reference signature block 505 corresponding to the block table entry.

The entry of the block table 715 corresponding to a particular reference signature block represented by the key 750 also includes example value data 760, which includes the current reference signature block 762 corresponding to this entry of the block table 715, as well as the previous reference signature block 764 and the next reference signature block 766. In the illustrated example of FIG. 7, the previous reference signature block 764 corresponds to the reference signature block 505 preceding the current reference signature block 762 in time and that is associated with the same source identifier 754 and stream identifier 756 as the current reference signature block 762. As such, the timestamp 510 of the previous reference signature block 764 may be the immediately preceding timestamp relative to the timestamp 752. In the illustrated example of FIG. 7, the next reference signature block 766 corresponds to the reference signature block 505 following the current reference signature block 762 in time and that is associated with the same source identifier 754 and stream identifier 756 as the current reference signature block 762. As such, the timestamp 510 of the next reference signature block 766 may be the immediately following timestamp relative to the timestamp 752.

In some examples, the entry of the block table 715 corresponding to a particular reference signature block represented by the key 750 further includes example qualifier data 770. In the illustrated example of FIG. 7, the qualifier data 770 includes example version data 772, which may be used to specify particular characteristics of the data stored in the block table 715. For example, FIG. 7 depicts specific example data sizes for the different data values in the entries of the hash table 710 and the block table 715. These data sizes may be associated with a particular value of the version data 772. In such examples, different values of the version data 772 may be used to specify different data sizes, or combinations of sizes, for the different data values in the entries of the block table 715.

In some examples, the hash table 710 and/or the block table 715 are implemented by one or more databases. For example, the hash table 710 and the block table 715 may be implemented by the crediting facility 115 using an Apache HBase™ database solution, a Structured Query Language (SQL) database solution, etc.

Returning to FIG. 6, the example hash table populator 610 of the illustrated example receives the reference signature blocks 505 and associated timestamps 510 and media identifiers 515 from the MMS 130 via the MMS interface 605. The hash table populator 610 of the illustrated example then populates the hash table 710, which is stored in an example hash table storage 620, using the received reference signature blocks 505 and associated timestamps 510 and media identifiers 515. For example, for a particular received reference signature block 505, the hash table populator 610 populates each reference signature included in the block 505 as a respective hash key 712 corresponding to a respective entry of the hash table 710. The hash table populator 610 of the illustrated example also populates the timestamp 722 for this hash table entry with the value of the timestamp 510 associated with the reference signature block 505, and populates the source identifier 724 and the stream identifier 726 for this hash table entry based on the media identifier 515 associated with the reference signature block 505. The hash table populator 610 further populates the offset 728 for this hash table entry with the position, in the reference block 505, of the particular reference signature corresponding to the hash key 712. In some examples, the hash table populator 610 populates the previous hash key 732 and the next hash key 734 of the value data 730 with the appropriate previous and next reference signatures relative to the particular reference signature corresponding to the hash key 712.

In some examples, the example hash table storage 620 is implemented by RAM to enable relatively fast access and processing of the hash table 710. For example, the hash table storage 620 can be implemented by the volatile memory 1214 and/or the local memory 1213 of the example processor platform 1200 of FIG. 12. In other examples, the hash table storage 620 is implemented by any mass storage device, such as one or more of the example mass storage devices 1228 of the example processor platform 1200 of FIG. 12. The example processor platform 1200 of FIG. 12 is described in further detail below.

The example block table populator 615 receives the reference signature blocks 505 and associated timestamps 510 and media identifiers 515 from the MMS 130 via the MMS interface 605. The block table populator 615 of the illustrated example then populates the block table 715, which is stored in an example block table storage 625, using the received reference signature blocks 505 and associated timestamps 510 and media identifiers 515. For example, for a particular received reference signature block 505, the block table populator 615 populates the key 750 of an entry in the block table 715 corresponding to the received reference signature block 505 as follows. The block table populator 615 populates the timestamp 752 of the key 750 for this block table entry with the value of the timestamp 510 associated with the reference signature block 505, and populates the source identifier 754 and the stream identifier 756 of the key 750 for this block table entry based on the media identifier 515 associated with the reference signature block 505. The block table populator 615 further populates the current reference signature block 762 of the value data 760 for this block table entry with the reference signatures included in the received reference signature block 505. Additionally, the block table populator 615 populates the previous reference signature block 764 and the next reference signature block 766 with the appropriate previous and next reference signature blocks relative to the current reference signature block 762. In some examples, the block table populator 615 also populates the qualifier data 770 for this block table entry with the appropriate version data 772.

Figure 12:
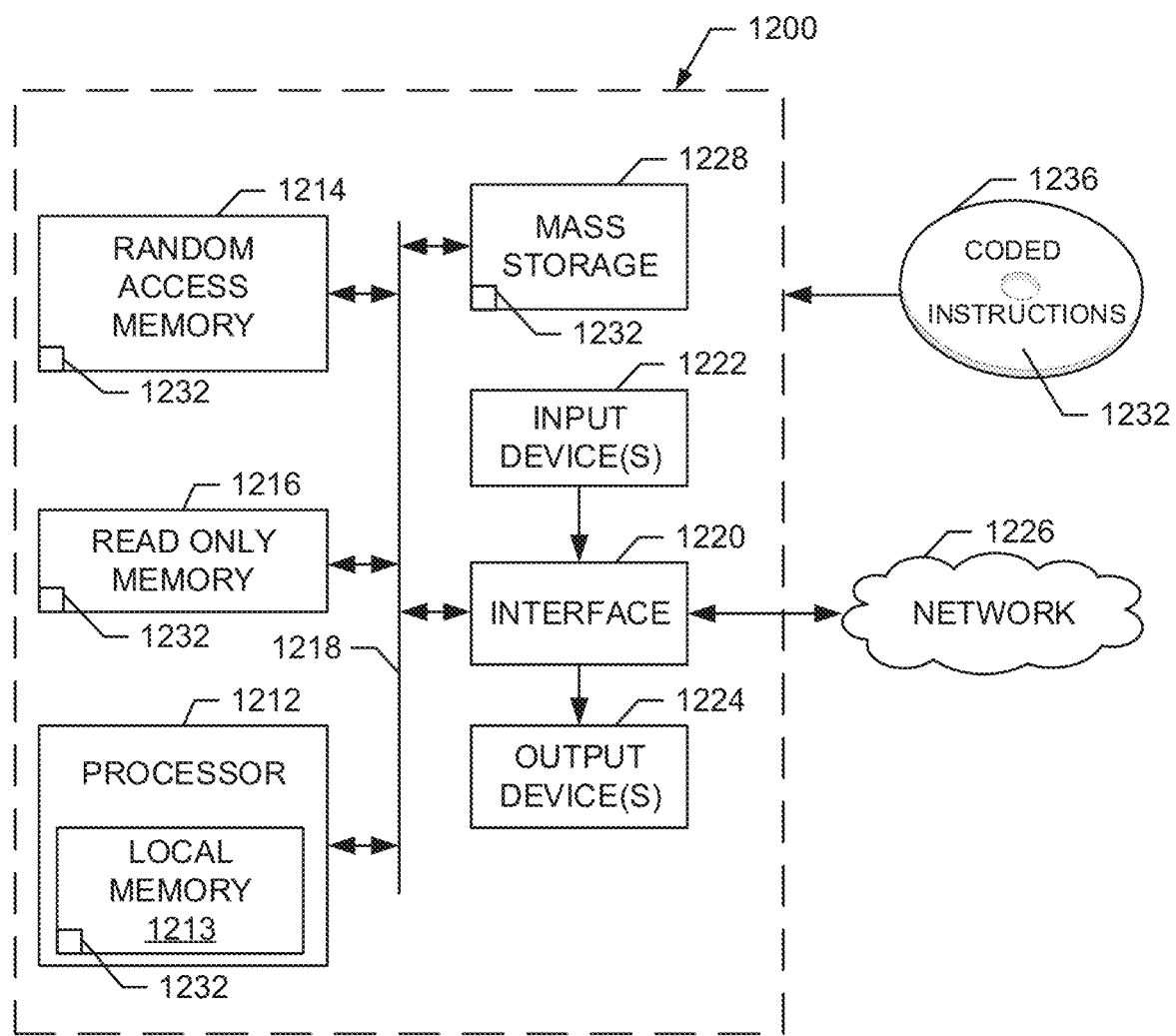
FIG. 12 is a block diagram of an example processor platform that may execute the example machine readable instructions of FIGS. 9, 10 and/or 11 to implement the example system of FIG. 1 and/or the example crediting facility of FIG. 6.

The example block table storage 625 may be implemented by any appropriate memory, storage device, etc., such as one or more of the volatile memory 1214, the local memory 1213, the mass storage device 1228 of the example processor platform 1200 of FIG. 12. The example processor platform 1200 of FIG. 12 is described in further detail below. Also, in some examples, the block table storage 625 may correspond to multiple storages 625 storing multiple block tables 715 (e.g., remotely).

The example crediting facility 115 of FIG. 6 also includes an example site interface 630 to interface with a monitored site, such as the example monitored site 120 of FIGS. 1 and/or 2. As such, the site interface 630 can be implemented using any interface technology, communication device(s), etc., capable of interfacing with and receiving data via the example reporting medium 125. The example site interface 630 receives metering data from the monitored site 120 including, for example, the site signatures 405 and the associated timestamps 410.

The example crediting facility 115 of FIG. 6 further includes an example hash table query processor 635 to query the hash table 710 stored in the hash table storage 620 using the site signatures 405 received via the site interface 630. For example, the hash table query processor 635 can implement an appropriate database query (e.g., such as an HBase query) to query the hash table 710 using a first site signature, such as the site signature 405A. In response to the query, the hash table query processor 635 returns one or more hash table entries corresponding respectively to one or more hash keys 712 (e.g., reference signatures) determined to match the site signature 405A. For example, for a particular hash key 712 (e.g., reference signature) determined to match the site signature 405A, the hash table query processor 635 of the illustrated example returns the qualifier data 720 (e.g., the timestamp 722, the source identifier 724, the stream identifier 726 and the offset 728) and the value data 730 (e.g., the previous hash key 732 and the next hash key 734) stored in the hash table entry corresponding to the matching hash key 712.

Because multiple hash keys 712 (e.g., reference signatures) may match a particular site signature (e.g., the site signature 405A), the example crediting facility 115 of FIG. 6 includes an example candidate qualifier 640 to prequalify candidate hash keys 712, which have been determined to match a particular site signature, for use in subsequent matching processing. For example, the hash table query processor 635 may return multiple hash keys 712 (and their associated hash table entries) in response to querying the hash table 710. These hash keys 712 are referred to herein as candidate hash keys 712 because one or more of these keys may not actually correspond to the media represented by the site signature used to query the hash table 710 (e.g., due to false matches). In such an example, the candidate qualifier 640 examines the candidate hash keys 712 to determine which ones should be retained as prequalified hash keys 712 that can form the basis for subsequent queries of the block table 715.

In the illustrated example, the candidate qualifier 640 performs prequalification of a particular candidate hash key 712 using the value data 730 associated with the candidate hash key 712. For example, the candidate qualifier 640 of the illustrated example can obtain the previous hash key 732 and the next hash key 734 included in the value data 730 for the particular candidate hash key 712. As noted above, the previous hash key 732 corresponds to the hash key (e.g., reference signature) preceding the hash key 712 in time, and the next hash key 734 corresponds to the hash key (e.g., reference signature) following the hash key 712 in time. In such examples, the candidate qualifier 640 compares the previous hash key 732 with the neighboring site signature preceding, in time, the site signature used to query the hash table 710, and compares the next hash key 734 with the neighboring site signature following, in time, the site signature used to query the hash table 710. For example, if the site signature 405B is used to query the hash table 710, then the candidate qualifier 640 compares the site signature 405A with the previous hash key 732 and compares the site signature 405C with the next hash key 734 for the candidate hash key 712 undergoing prequalification. If both comparisons are successful (e.g., the previous hash key 732 matches the previous site signature and the next hash key 734 matches the following site signature), then the candidate qualifier 640 indicates that prequalification for the particular candidate hash key 712 is successful and this key is retained for use in querying the block table 715 (or, in other words, the qualifier data 720 associated with the particular candidate hash key 712 is used to query the block table 715 in response to a successful prequalification of the particular candidate hash key 712 based on its associated value data 730, which includes the previous hash key 732 and the next hash key 734). Otherwise (e.g., if either comparison is unsuccessful), then the candidate qualifier 640 indicates that prequalification for the particular candidate hash key 712 is unsuccessful and this key is not retained for use in querying the block table 715 (or, in other words, the qualifier data 720 associated with the particular candidate hash key 712 is not used to query the block table 715 in response to an unsuccessful prequalification of the particular candidate hash key 712 based on its associated value data 730, which includes the previous hash key 732 and the next hash key 734). In some examples, the candidate qualifier 640 performs the preceding prequalification process for each candidate hash key 712 returned in response to a query of the hash table 710.

The example crediting facility 115 of FIG. 6 includes an example block table query processor 645 to query the block table 715 stored in the block table storage 625 using the prequalified candidate hash keys 712 (e.g., reference signatures) identified by the candidate qualifier 640. In the illustrated example, for a particular candidate hash key 712 returned by the hash table query processor 635 in response to a hash table query using a particular site signature (e.g., and prequalified by the candidate qualifier 640), the block table query processor 645 can implement an appropriate database query (e.g., such as an HBase query) to query the block table 715 using the qualifier data 720 associated with the particular candidate hash key 712. For example, the qualifier data 720 for the particular candidate hash key 712 includes the timestamp 722, the source identifier 724 and the stream identifier 726, which can be used to query the block table 715 to find a key 750 having a matching timestamp 752, source identifier 754 and stream identifier 756. In response to this block table query, the block table query processor 645 returns the key 750 having the timestamp 752, the source identifier 754 and the stream identifier 756 that match the timestamp 722, the source identifier 724 and the stream identifier 726 in the qualifier data 720 for the particular candidate hash key 712. Additionally, the block table query processor 645 returns the current reference signature block 762, the previous reference signature block 764 and the next reference signature block 766 included in the value data 760 for this block table entry.

In the illustrated example of FIG. 6, the block table query processor 645 provides the current reference signature block 762, the previous reference signature block 764 and the next reference signature block 766 obtained from the query of the block table 715 for a particular candidate hash key 712 to an example signature matcher 650. The signature matcher 650 of the illustrated example compares a block of neighboring site signatures, which includes (e.g., is centered on, begins with, ends with, etc.) the particular site signature used to obtain the particular candidate hash key 712, with an appropriately aligned, overlapping portion of the current reference signature block 762, the previous reference signature block 764 and/or the next reference signature block 766 for the particular candidate hash key 712. The appropriate alignment of the site signature block to the overlapping portion of the current, previous and/or next reference signature block(s) 762-766 is determined using the offset 728 included in the qualifier data 720 for the particular candidate hash key 712.

The signature matcher 650 uses any appropriate metric to compare the site signature block with the overlapping portion of the current, previous and/or next reference signature block(s) 762-766. For example, if the site signatures and reference signatures are all digital values represented by sequences of bits, the signature matcher 650 can use a POP count to count the number of bits that are different between the site signature block and the overlapping portion of the current, previous and/or next reference signature block(s) 762-766. If the number of different bits satisfies/meets (e.g., is less than, or is less than or equal to) a threshold, the signature matcher 650 determines that the site signature block matches the overlapping portion of the current, previous and/or next reference signature block(s) 762-766. Conversely, if the number of different bits fails to satisfy/meet (e.g., is greater than, or is greater than or equal to) the threshold, the signature matcher 650 determines that the site signature block fails to match the overlapping portion of the current, previous and/or next reference signature block(s) 762-766.

Figure 8:
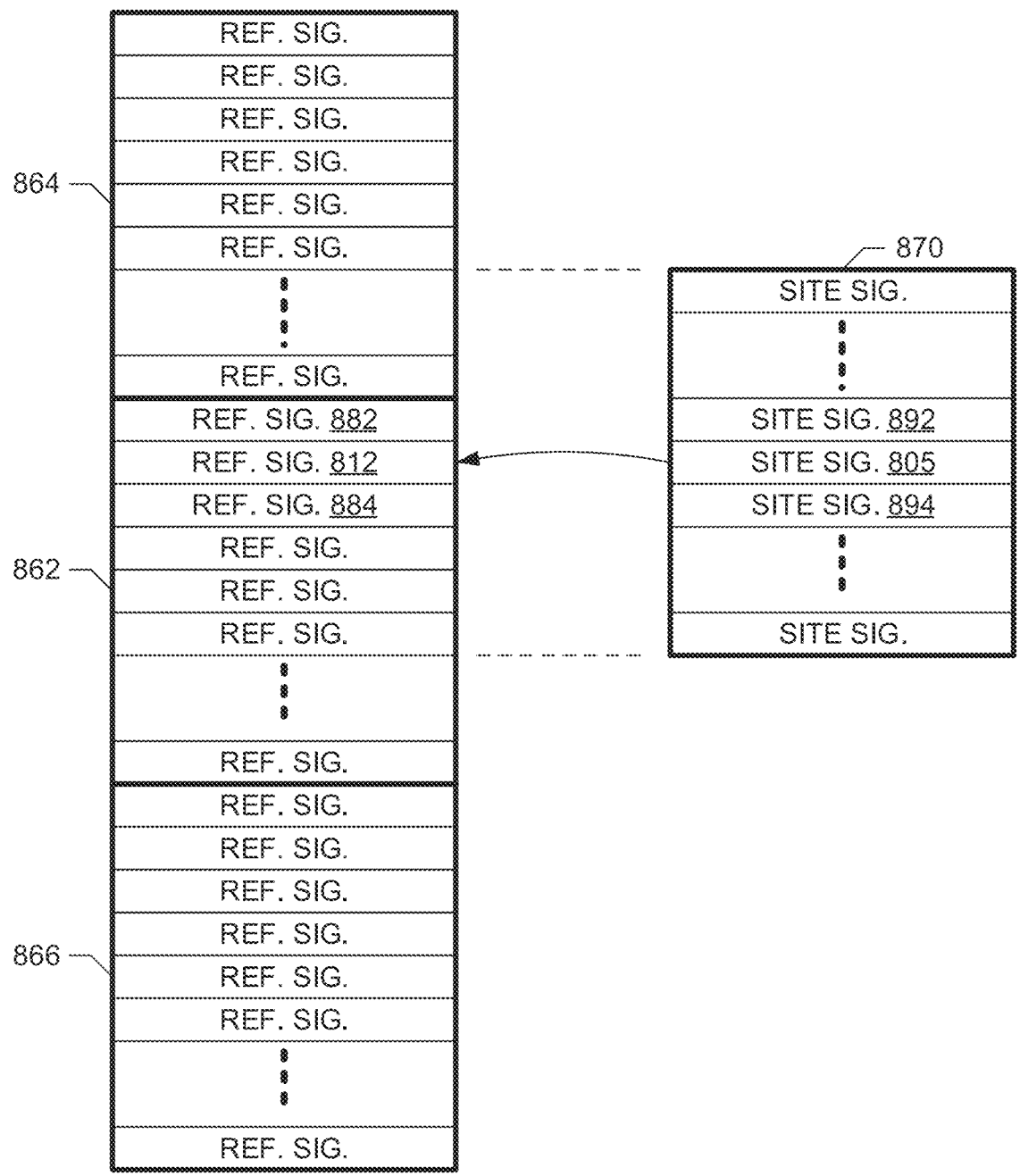
FIG. 8 illustrates an example signature matching operation capable of being performed by the example crediting facility of FIG. 6.

An example matching operation capable of being performed by the example signature matcher 650 of FIG. 6 is illustrated in FIG. 8. In the illustrated example of FIG. 8, a first site signature 805 has been used to query the hash table 710 to obtain a candidate (e.g., and prequalified) hash key 712. The reference signature corresponding to this candidate hash key 712 is denoted using the reference numeral 812 in the example of FIG. 8. A query of the block table 715 using the qualifier data 720 for this candidate hash key 712 returns the current, previous and next reference signature block(s) 762-766. The particular current, previous and next reference signature block(s) 762-766 for this candidate hash key 712 are denoted using the respective reference numerals 862, 864 and 866 in the example of FIG. 8.

The offset 728 included in the qualifier data 720 for this candidate hash key 712 specifies the location of the reference signature 812 (which corresponds to this candidate hash key 712) in the current reference signature block 862. Accordingly, the signature matcher 650 is able to align the site signature 805 (which was used to query the hash table 710) with the reference signature 812 (which corresponds to this matching candidate hash key 712) using the offset as shown in the example of FIG. 8. Furthermore, the example signature matcher 650 forms, from the neighboring received site signatures preceding and following the site signature 805 in time, a site signature block 870 centered about the site signature 805 and containing a number of site signatures equal to the number of reference signatures (e.g., 64 signatures, 128 signatures, etc.) included in one of the reference signature blocks 862, 864 and 866. The signature matcher 650 uses the offset 728 to align the site signature block 870 with the appropriate portion of the reference signature blocks 862, 864 and 866 (e.g., which corresponds to a portion of the current and previous reference signature blocks 862 and 864 in the illustrated example). The signature matcher 650 then determines a POP count or some other comparison metric to determine whether the site signature block 870 matches the aligned, overlapping portion of the reference signature blocks 862, 864 and 866.

FIG. 8 also depicts example hash keys and example site signatures that could be used to prequalify the hash key corresponding to the reference signature 812. In the illustrated example, the reference signature 882 corresponds to the previous hash key 732 and the reference signature 884 corresponds to the next hash key 734 included in the value data 730 for the hash key corresponding to the reference signature 812. In the illustrated example, to prequalify the hash key 712 corresponding to the reference signature 812, the example candidate qualifier 640 compares the reference signature 882 (or its corresponding hash key) with the neighboring site signature 892 preceding the site signature 805 in time, and compares the reference signature 884 (or its corresponding hash key) with the neighboring site signature 894 preceding the site signature 805 in time, as shown.

While example manners of implementing the example crediting facility 115 and, more generally, the example system 100 are illustrated in FIGS. 1-8, one or more of the elements, processes and/or devices illustrated in FIGS. 1-8 may be combined, divided, re-arranged, omitted, eliminated and/or implemented in any other way. Further, the example media distributor(s) 105, the example monitored site(s) 120, the example MMS 130, the example media device 205, the example device meter 210, the example people meter 215, the example media receiver(s) 305, the example signature generator(s) 310, the example time determiner(s) 315, the example data reporter 320, the example MMS interface 605, the example hash table populator 610, the example block table populator 615, the example hash table storage 620, the example block table storage 625, the example site interface 630, the example hash table query processor 635, the example candidate qualifier 640, the example block table query processor 645, the example signature matcher 650 and/or, more generally, the example crediting facility 115 and/or the example system 100 of FIGS. 1-8 may be implemented by hardware, software, firmware and/or any combination of hardware, software and/or firmware. Thus, for example, any of the example media distributor(s) 105, the example monitored site(s) 120, the example MMS 130, the example media device 205, the example device meter 210, the example people meter 215, the example media receiver(s) 305, the example signature generator(s) 310, the example time determiner(s) 315, the example data reporter 320, the example MMS interface 605, the example hash table populator 610, the example block table populator 615, the example hash table storage 620, the example block table storage 625, the example site interface 630, the example hash table query processor 635, the example candidate qualifier 640, the example block table query processor 645, the example signature matcher 650 and/or, more generally, the example crediting facility 115 and/or the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example system 100, the example crediting facility 115, the example media distributor(s) 105, the example monitored site(s) 120, the example MMS 130, the example media device 205, the example device meter 210, the example people meter 215, the example media receiver(s) 305, the example signature generator(s) 310, the example time determiner(s) 315, the example data reporter 320, the example MMS interface 605, the example hash table populator 610, the example block table populator 615, the example hash table storage 620, the example block table storage 625, the example site interface 630, the example hash table query processor 635, the example candidate qualifier 640, the example block table query processor 645 and/or the example signature matcher 650 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 and/or the example crediting facility 115 may include one or more elements, processes and/or devices in addition to, or instead of, those illustrated in FIGS. 1-8, and/or may include more than one of any or all of the illustrated elements, processes and devices.

Figure 9:
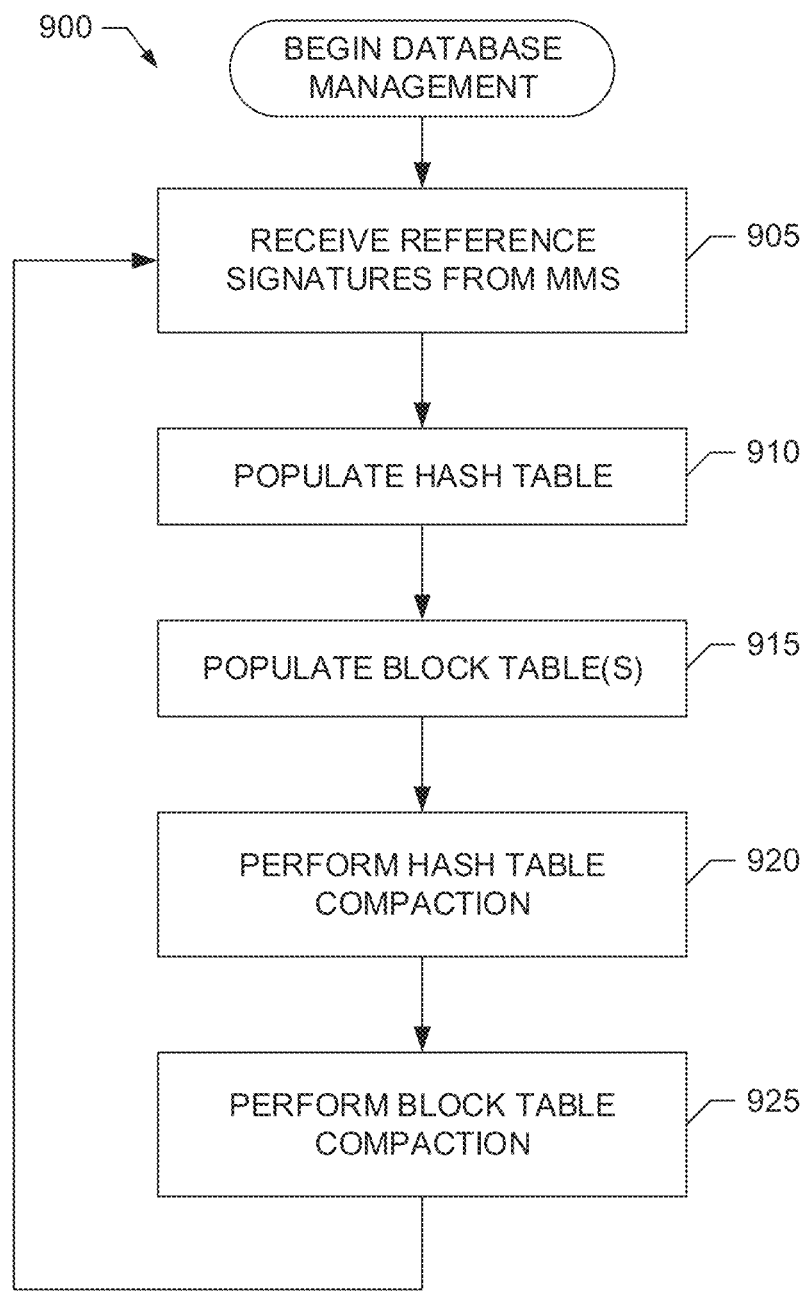
FIG. 9 is a flowchart representative of first example machine readable instructions that may be executed to implement signature retrieval and matching for media monitoring in the example crediting facility of FIG. 6.
Figure 10:
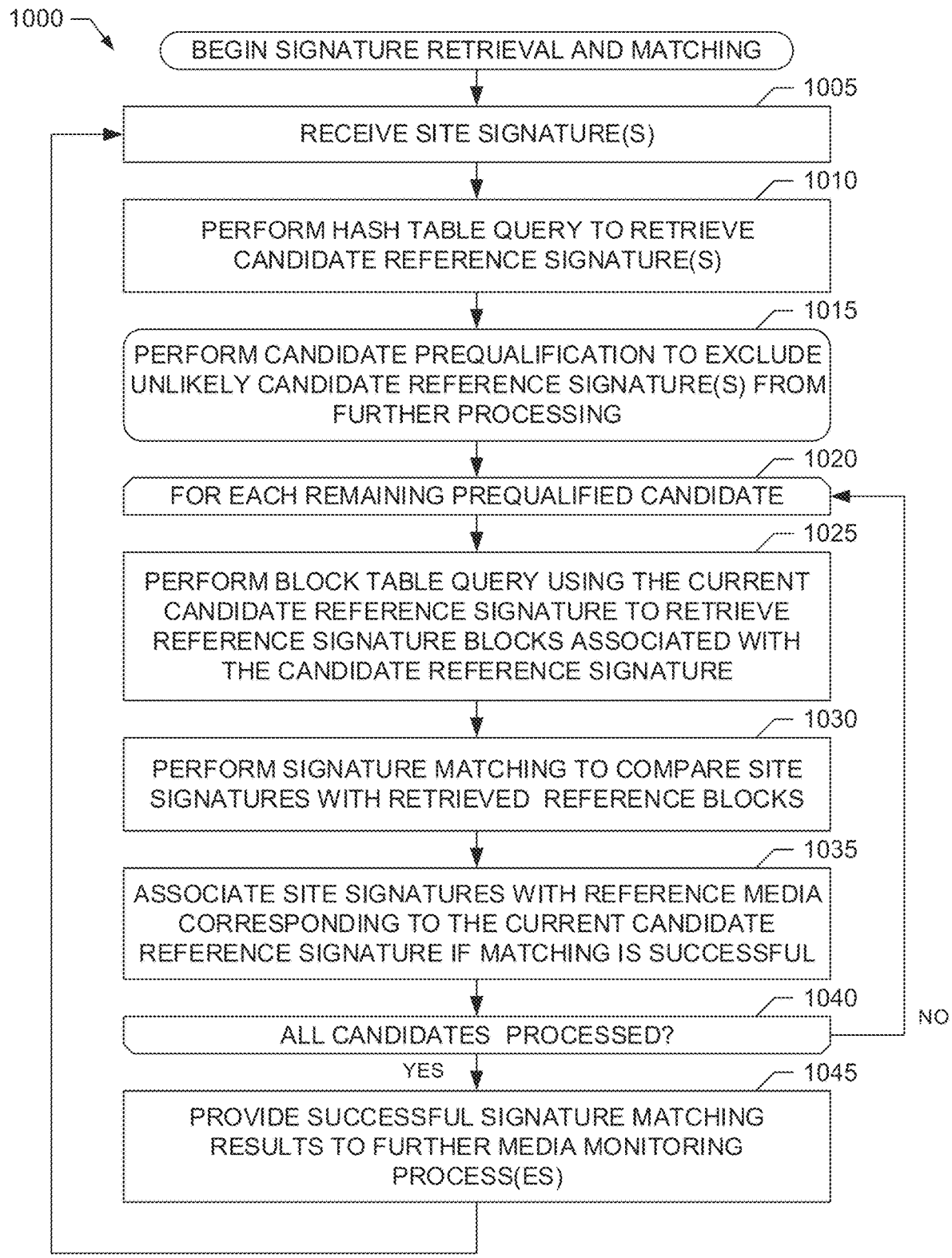
FIG. 10 is a flowchart representative of second example machine readable instructions that may be executed to implement signature retrieval and matching for media monitoring in the example crediting facility of FIG. 6.
Figure 11:
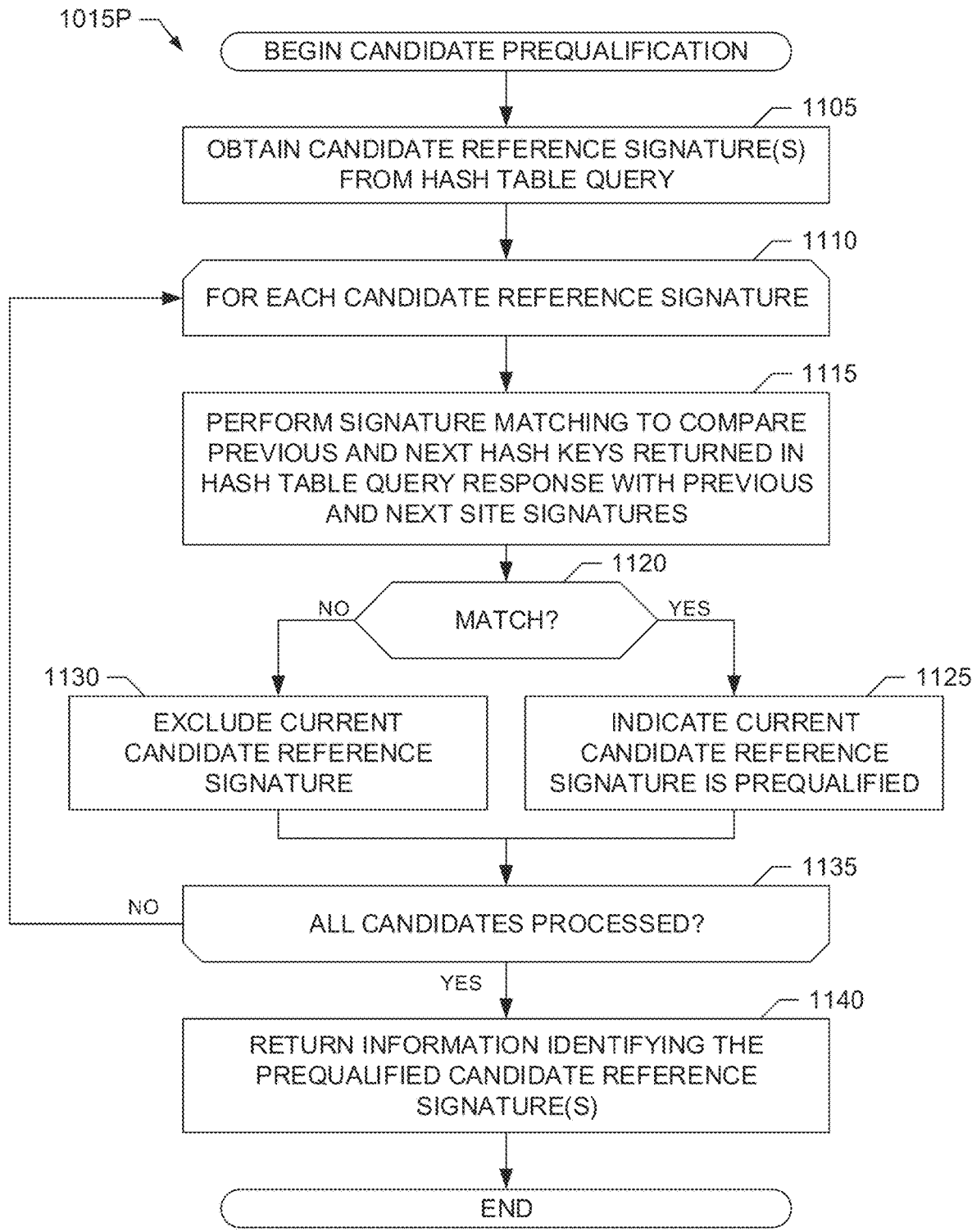
FIG. 11 is a flowchart representative of example machine readable instructions that may be executed to implement candidate prequalification in the example crediting facility of FIG. 6.

Flowcharts representative of example machine readable instructions for implementing the example system 100, the example crediting facility 115, the example media distributor(s) 105, the example monitored site(s) 120, the example MMS 130, the example media device 205, the example device meter 210, the example people meter 215, the example media receiver(s) 305, the example signature generator(s) 310, the example time determiner(s) 315, the example data reporter 320, the example MMS interface 605, the example hash table populator 610, the example block table populator 615, the example hash table storage 620, the example block table storage 625, the example site interface 630, the example hash table query processor 635, the example candidate qualifier 640, the example block table query processor 645 and/or the example signature matcher 650 are shown in FIGS. 9-11. In these examples, the machine readable instructions comprise one or more programs for execution by a processor, such as the processor 1212 shown in the example processor platform 1200 discussed below in connection with FIG. 12. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 1212, but the entire program or programs and/or portions thereof could alternatively be executed by a device other than the processor 1212 and/or embodied in firmware or dedicated hardware (e.g., implemented by an ASIC, a PLD, an FPLD, discrete logic, etc.). Also, one or more of the machine readable instructions represented by the flowcharts of FIGS. 9-11 may be implemented manually. Further, although the example program(s) is(are) described with reference to the flowcharts illustrated in FIGS. 9-11, many other methods of implementing the example system 100, the example crediting facility 115, the example media distributor(s) 105, the example monitored site(s) 120, the example MMS 130, the example media device 205, the example device meter 210, the example people meter 215, the example media receiver(s) 305, the example signature generator(s) 310, the example time determiner(s) 315, the example data reporter 320, the example MMS interface 605, the example hash table populator 610, the example block table populator 615, the example hash table storage 620, the example block table storage 625, the example site interface 630, the example hash table query processor 635, the example candidate qualifier 640, the example block table query processor 645 and/or the example signature matcher 650 may alternatively be used. For example, with reference to the flowcharts illustrated in FIGS. 9-11, the order of execution of the blocks may be changed, and/or some of the blocks described may be changed, eliminated, combined and/or subdivided into multiple blocks.

As mentioned above, the example processes of FIGS. 9-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9-11 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

A first example program 900 that may be executed to implement the example crediting facility 115 of FIGS. 1 and/or 6 is represented by the flowchart shown in FIG. 9. With reference to the preceding figures and associated written descriptions, the example program 900 of FIG. 9 begins execution at block 905 at which the example MMS interface 605 of the crediting facility 115 receives reference data from the MMS 130 as described above, which includes the reference signature blocks 505, the associated timestamps 510 and the media identifiers 515. At block 910, the example hash table populator 610 of the crediting facility 115 populates, as described above, the example hash table 710 with the reference data received at block 905. At block 915, the example block table populator 615 of the crediting facility 115 populates, as described above, the example block table 715 with the reference data received at block 905.

In some examples, at block 920, the crediting facility 115 performs hash table compaction to purge out-of-date reference data from the hash table 710. Similarly, in some examples, at block 925 the crediting facility 115 performs block table compaction to purge out-of-date reference data from the block table 715. For example, in an HBase implementation, the data included in entries of the hash table 710 and/or the block table 715 can be tagged with time-to-live values specifying a duration (e.g., such as a number of days, weeks, etc.) during which the data should be retained in the respective hash table 710 and/or block table 715. Upon expiration of the time-to-live values, the crediting facility 115 purges the expired hash table data at block 920, and purges the expired block table data at block 925.

A second example program 1000 that may be executed to implement the example crediting facility 115 of FIGS. 1 and/or 6 is represented by the flowchart shown in FIG. 10. With reference to the preceding figures and associated written descriptions, the example program 1000 of FIG. 10 begins execution at block 1005 at which the example site interface 630 of the crediting facility 115 receives metering data, which includes the site signatures 405 and the associated timestamps 410, from a monitored site 120, as described above. At block 1010, the example hash table query processor 635 of the crediting facility 115 queries the hash table 710, as described above, to retrieve candidate hash keys 712 (e.g., corresponding to respective reference signatures) matching a particular site signature. At block 1010, the query of the hash table for a particular site signature returns the candidate hash keys 712 (e.g., corresponding to respective reference signatures) matching a particular site signature, as well as the qualifier data 720 and the value data 730 for these candidate hash keys 712. At block 1015, the example candidate qualifier 640 of the crediting facility performs candidate prequalification, as described above, to retain the prequalified candidate hash keys 712 to be used in subsequent signature matching processing (and to exclude the other candidate hash keys). Example machine readable instructions that may be used to implement the processing at block 1015 are illustrated in FIG. 11 and described in further detail below.

At block 1020, the crediting facility 1020 configures the example block table query processor 645 and the example signature matcher 650 to process each prequalified candidate hash key 712 retained at block 1015. For example, at block 1025, the block table query processor 645 queries the block table 715, as described above, using the qualifier data 720 for a given prequalified candidate hash key 712 (e.g., corresponding to a respective reference signature) to retrieve the current, previous and next reference signature blocks 762-766 corresponding to the given prequalified candidate hash key 712. At block 1030, the signature matcher 650 performs signature matching, as described above, to compare a portion of the current, previous and next reference signature blocks 762-766 corresponding to the given prequalified candidate hash key 712 with a site signature block containing the particular site signature used to obtain the prequalified candidate hash key 712. At block 1035, the signature matcher 650 associates the site signatures in the site signature block with the reference media represented by the current, previous and next reference signature blocks 762-766 corresponding to the given prequalified candidate hash key 712 if the matching performed at block 1030 was successful. At block 1040, the crediting facility 115 causes processing to continue until all prequalified candidate hash keys 712 have been processed. At block 1045, the signature matcher 150 provides the successful signature matching results to further media monitoring process(es) (e.g., to credit the media monitored at the monitored site 120 as corresponding to the reference media represented by the reference signatures determined to match the site signatures at block 1035).

An example program 1015P that may be executed to implement the example candidate qualifier 640 of the example crediting facility 115 of FIG. 6, and/or that may be used to perform the processing at block 1015 of FIG. 10, is represented by the flowchart shown in FIG. 11. With reference to the preceding figures and associated written descriptions, the example program 1015P of FIG. 11 begins execution at block 1105 at which the candidate qualifier 640 obtains a group of candidate hash keys 712 (e.g., corresponding to respective reference signatures) that were returned in response to a query of the hash table 710 using a particular site signature, as described above. At block 1110, the candidate qualifier 640 is configured to perform prequalification for each of the candidate hash keys 712. For example, and as described above, at block 1115, the candidate qualifier 640 compares the previous hash key 732 included in the value data 730 for a given candidate hash key 712 with the site signature preceding, in time, of the particular site signature used to query the hash table 710. At block 1115, the candidate qualifier 640 also compares the next hash key 736 732 included in the value data 730 for a given candidate hash key 712 with the site signature following, in time, the particular site signature used to query the hash table 710.

At block 1120, the candidate qualifier 640 determines if both comparisons performed at block 1115 were successful (e.g., if the previous hash key 732 matched the previous site signature and the next hash key 734 matched the subsequent site signature). If both comparisons were successful (block 1120), at block 1125 the candidate qualifier 640 indicates that the given candidate hash key 712 is prequalified for use in further signature matching processing for the current site signature. However, if either comparisons was unsuccessful (block 1120), at block 1125 the candidate qualifier 640 causes the given candidate hash key 712 to be excluded from use in further signature matching processing for the current site signature. At block 1135, the candidate qualifier 640 continues performing prequalification processing until all candidate hash keys 712 have been processed. At block 1140, the candidate qualifier 640 returns information identifying the resulting prequalified candidate hash keys 712 (e.g., which correspond to respective reference signatures).

FIG. 12 is a block diagram of an example processor platform 1200 capable of executing the instructions of FIGS. 9-11 to implement the example system 100, the example crediting facility 115, the example media distributor(s) 105, the example monitored site(s) 120, the example MMS 130, the example media device 205, the example device meter 210, the example people meter 215, the example media receiver(s) 305, the example signature generator(s) 310, the example time determiner(s) 315, the example data reporter 320, the example MMS interface 605, the example hash table populator 610, the example block table populator 615, the example hash table storage 620, the example block table storage 625, the example site interface 630, the example hash table query processor 635, the example candidate qualifier 640, the example block table query processor 645 and/or the example signature matcher 650 of FIGS. 1-8. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a link 1218. The link 1218 may be implemented by a bus, one or more point-to-point connections, etc., or a combination thereof. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1200, can allow the user to control the computer system and provide data to the computer using physical gestures, such as, but not limited to, hand or body movements, facial expressions, and face recognition.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID (redundant array of independent disks) systems, and digital versatile disk (DVD) drives.

Coded instructions 1232 corresponding to the instructions of FIGS. 9-11 may be stored in the mass storage device 1228, in the volatile memory 1214, in the non-volatile memory 1216, in the local memory 1213 and/or on a removable tangible computer readable storage medium, such as a CD or DVD 1236.

Example methods, apparatus, systems and articles of manufacture to perform signature retrieval and matching for media monitoring have been disclosed herein. Further example techniques to identify media using hash keys, which can be employed in conjunction with the examples provided herein, are disclosed in U.S. Provisional Application Ser. No. 61/976,238, entitled "METHODS AND APPARATUS TO IDENTIFY MEDIA USING HASH KEYS" and filed on Apr. 7, 2014, which is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a query processor to obtain a first hash key, first qualifier data and first value data associated with the first hash key in response to a first query of a first table, the first value data including a second hash key and a third hash key both representative of a first reference media, the second hash key preceding the first hash key in time and the third hash key following the first hash key in time;
    a candidate qualifier to use the first value data to pre-qualify the first hash key as a candidate for subsequent signature processing associated with a first site signature, the candidate qualifier to:
        determine prequalification of the first hash key is successful in response to a determination that the second hash key matches a second site signature preceding the first site signature in time and that the third hash key matches a third site signature following the first site signature in time; and
        determine the prequalification of the first hash key is unsuccessful in response to a determination that at least one of the second hash key fails to match the second site signature or the third hash key fails to match the third site signature.

2. The apparatus of claim 1, wherein the query processor is to perform the first query of the first table based on a hash corresponding to the first site signature, the first site signature obtained from a monitored site.

3. The apparatus of claim 1, wherein the first table includes hash keys corresponding to respective reference signatures, and the first qualifier data is descriptive of a reference signature corresponding to the first hash key.

4. The apparatus of claim 3, wherein the query processor is a first query processor, and further including a second query processor to perform a second query of a second table based on the first qualifier data obtained from the first query of the first table, the second query to obtain, from the second table, a plurality of blocks of reference signatures, the second table different than the first table.

5. The apparatus of claim 4, wherein the first qualifier data includes a first timestamp associated with a first block of reference signatures including the reference signature, the first qualifier data also including first media identification data identifying first reference media represented by the reference signature.

6. The apparatus of claim 5, further including a crediting facility to credit media, monitored at a monitored site, as corresponding to the first reference media represented by the reference signature when the prequalification of the first hash key is successful.

7. A non-transitory computer readable medium comprising computer readable instructions which, when execute, cause at least one processor to at least:
obtain a first hash key, first qualifier data and first value data associated with the first hash key in response to a first query of a first table, the first value data including a second hash key and a third hash key both representative of a first reference media, the second hash key preceding the first hash key in time and the third hash key following the first hash key in time;
determine prequalification of the first hash key as a candidate for subsequent signature processing associated with a first site signature is successful in response to a determination that the second hash key matches a second site signature preceding the first site signature in time and that the third hash key matches a third site signature following the first site signature in time; and
determine the prequalification of the first hash key is unsuccessful in response to a determination that at least one of the second hash key fails to match the second site signature or the third hash key fails to match the third site signature.

8. The non-transitory computer readable medium of claim 7, wherein the instructions cause the at least one processor to perform the first query of the first table based on a hash corresponding to the first site signature, the first site signature obtained from a monitored site.

9. The non-transitory computer readable medium of claim 7, wherein the first table includes hash keys corresponding to respective reference signatures, and the first qualifier data is descriptive of a reference signature corresponding to the first hash key.

10. The non-transitory computer readable medium of claim 9, wherein the instructions cause the at least one processor to perform a second query of a second table based on the first qualifier data obtained from the first query of the first table, the second query to obtain, from the second table, a plurality of blocks of reference signatures, the second table different than the first table.

11. The non-transitory computer readable medium of claim 10, wherein the first qualifier data includes a first timestamp associated with a first block of reference signatures including the reference signature, the first qualifier data also including first media identification data identifying first reference media represented by the reference signature.

12. The non-transitory computer readable medium of claim 11, wherein the instructions cause the at least one processor to credit media, monitored at a monitored site, as corresponding to the first reference media represented by the reference signature when the prequalification of the first hash key is successful.

13. A method comprising:
obtaining a first hash key, first qualifier data and first value data associated with the first hash key in response to a first query of a first table, the first value data including a second hash key and a third hash key both representative of a first reference media, the second hash key preceding the first hash key in time and the third hash key following the first hash key in time;
determining, by executing an instruction with at least one processor, prequalification of the first hash key as a candidate for subsequent signature processing associated with a first site signature is successful in response to a determination that the second hash key matches a second site signature preceding a first site signature in time and that the third hash key matches a third site signature following the first site signature in time; and
determining, by executing an instruction with the at least one processor, the prequalification of the first hash key is unsuccessful in response to a determination that at least one of the second hash key fails to match the second site signature or the third hash key fails to match the third site signature.

14. The method of claim 13, further including performing the first query of the first table based on a hash corresponding to the first site signature, the first site signature obtained from a monitored site.

15. The method of claim 13, wherein the first table includes hash keys corresponding to respective reference signatures, and the first qualifier data is descriptive of a reference signature corresponding to the first hash key.

16. The method of claim 15, further including performing a second query of a second table based on the first qualifier data obtained from the first query of the first table, the second query to obtain, from the second table, a plurality of blocks of reference signatures, the second table different than the first table.

17. The method of claim 16, wherein the first qualifier data includes a first timestamp associated with a first block of reference signatures including the reference signature, the first qualifier data also including first media identification data identifying first reference media represented by the reference signature.

18. The method of claim 17, further including crediting media, monitored at a monitored site, as corresponding to the first reference media represented by the reference signature when the prequalification of the first hash key is successful.

* * * * *